United States Patent
Agarwal et al.

(10) Patent No.: US 8,560,780 B1
(45) Date of Patent: Oct. 15, 2013

(54) CACHING IN MULTICORE AND MULTIPROCESSOR ARCHITECTURES

(75) Inventors: Anant Agarwal, Weston, MA (US); Ian R. Bratt, Boston, MA (US); Matthew Mattina, Worcester, MA (US)

(73) Assignee: Tilera Corporation, Westborough, MA (US)

( * ) Notice: Subject to any disclaimer, the term of this patent is extended or adjusted under 35 U.S.C. 154(b) by 0 days.

(21) Appl. No.: 13/553,884

(22) Filed: Jul. 20, 2012

Related U.S. Application Data

(63) Continuation of application No. 13/190,035, filed on Jul. 25, 2011, now Pat. No. 8,234,451, which is a continuation of application No. 12/966,686, filed on Dec. 13, 2010, now Pat. No. 7,987,321, which is a continuation of application No. 11/754,162, filed on May 25, 2007, now Pat. No. 7,853,755.

(60) Provisional application No. 60/827,473, filed on Sep. 29, 2006, provisional application No. 60/882,318, filed on Dec. 28, 2006.

(51) Int. Cl.
*G06F 12/00* (2006.01)
(52) U.S. Cl.
USPC .......................................................... 711/141
(58) Field of Classification Search
None
See application file for complete search history.

(56) References Cited

U.S. PATENT DOCUMENTS

| | | | |
|---|---|---|---|
| 5,057,837 A | 10/1991 | Colwell et al. | |
| 5,119,485 A | 6/1992 | Ledbetter et al. | |
| 5,148,536 A | 9/1992 | Witek et al. | |
| 5,179,680 A | 1/1993 | Colwell et al. | |
| 5,241,639 A | 8/1993 | Feldbrugge | |
| 5,430,888 A | 7/1995 | Witek et al. | |
| 5,596,754 A | 1/1997 | Lomet | |
| 5,893,153 A | 4/1999 | Tzeng et al. | |
| 5,960,461 A | 9/1999 | Frank et al. | |
| 6,138,166 A * | 10/2000 | Heller et al. | 709/251 |
| 6,321,323 B1 * | 11/2001 | Nugroho et al. | 712/34 |
| 6,332,178 B1 | 12/2001 | Dean et al. | |
| 6,651,145 B1 | 11/2003 | Jamil et al. | |
| 6,795,897 B2 | 9/2004 | Benveniste | |
| 7,200,713 B2 | 4/2007 | Cabot et al. | |
| 7,394,288 B1 | 7/2008 | Agarwal | |
| 7,461,236 B1 | 12/2008 | Wentzlaff | |
| 7,539,845 B1 | 5/2009 | Wentzlaff et al. | |
| 2002/0129208 A1 | 9/2002 | Barroso et al. | |
| 2004/0008677 A1 | 1/2004 | Cen | |

(Continued)

FOREIGN PATENT DOCUMENTS

WO WO 2004/072796 8/2004

OTHER PUBLICATIONS

Agarwal, Anant. "Raw Computation," Scientific *American* vol. 281, No. 2: 44-47, Aug. 1999.
Taylor, Michael Bedford et. al., "Evaluation of the Raw Microprocessor: An Exposed-Wire-Delay Architecture for ILP and Streams," *Proceedings of International Symposium on Computer Architecture*, Jun. 2004.

(Continued)

*Primary Examiner* — Brian Peugh
(74) *Attorney, Agent, or Firm* — Fish & Richardson P.C.

(57) ABSTRACT

A multicore processor comprises a plurality of cache memories, and a plurality of processor cores, each associated with one of the cache memories. Each of at least some of the cache memories is configured to maintain at least a portion of the cache memory in which each cache line is dynamically managed as either local to the associated processor core or shared among multiple processor cores.

26 Claims, 11 Drawing Sheets

(56) References Cited

U.S. PATENT DOCUMENTS

| | | | |
|---|---|---|---|
| 2005/0071573 | A1 | 3/2005 | Dodson et al. |
| 2005/0144390 | A1 | 6/2005 | Mattina et al. |
| 2006/0179429 | A1 | 8/2006 | Eggers et al. |
| 2007/0043913 | A1 | 2/2007 | Hetherington et al. |
| 2007/0055825 | A1 | 3/2007 | Blumrich et al. |

OTHER PUBLICATIONS

Taylor, Michael Bedford et. al., "Scalar Operand Networks: On-Chip Interconnect for ILP in Partitioned Architectures," *Proceedings of the International Symposium on High Performance Computer Architecture*, Feb. 2003.

Taylor, Michael Bedford et. al., "A 16-Issue Multiple-Program-Counter Microprocessor with Point-to-Point Scalar Operand Network," *Proceedings of the IEEE International Solid-State Circuits Conference*, Feb. 2003.

Taylor, Michael Bedford et. al., "The Raw Microprocessor: A Computational Fabric for Software Circuits and General-Purpose Programs," *IEEE Micro*, pp. 25-35, Mar.-Apr. 2002.

Lee, Walter et. al., "Space-Time Scheduling of Instruction-Level Parallelism on a Raw Machine," *Proceedings of the Eighth International Conference on Architectural Support for Programming Languages and Operating Systems (ASPLOS-VIII)*, San Jose, CA, Oct. 4-7, 1998.

Kim, Jason Sungtae et. al., "Energy Characterization of a Tiled Architecture Processor with On-Chip Networks," *International Symposium on Low Power Electronics and Design*, Seoul, Korea, Aug. 25-27, 2003.

Barua, Rajeev et. al., "Compiler Support for Scalable and Efficient Memory Systems," *IEEE Transactions on Computers*, Nov. 2001.

Waingold, Elliot et. al., "Baring it all to Software: Raw Machines," *IEEE Computer*, pp. 86-93, Sep. 1997.

Lee, Walter et. al., "Convergent Scheduling," *Proceedings of the 35th International Symposium on Microarchitecture*, Istanbul, Turkey, Nov. 2002.

Wentzlaff, David and Anant Agarwal, "A Quantitative Comparison of Reconfigurable, Tiled, and Conventional Architectures on Bit-Level Computation," *MIT/LCS Technical Report LCS-TR-944*, Apr. 2004.

Suh, Jinwoo et. al., "A Performance Analysis of PIM, Stream Processing, and Tiled Processing on Memory-Intensive Signal Processing Kernels," *Proceedings of the International Symposium on Computer Architecture*, Jun. 2003.

Barua, Rajeev et. al., "Maps: A Compiler-Managed Memory System for Raw Machines," *Proceedings of the Twenty-Sixth International Symposium on Computer Architecture (ISCA-26)*, Atlanta, GA, Jun. 1999.

Barua, Rajeev et. al., "Memory Bank Disambiguation using Modulo Unrolling for Raw Machines," *Proceedings of the Fifth International Conference on High Performance Computing*, Chennai, India, Dec. 17-20, 1998.

Agarwal, A. et. al., "The Raw Compiler Project," *Proceedings of the Second SUIF Compiler Workshop*, Stanford, CA, Aug. 21-23, 1997.

Taylor, Michael Bedford et. al., "Scalar Operand Networks," *IEEE Transactions on Parallel and Distributed Systems (Special Issue on On-Chip Networks)*, Feb. 2005.

Taylor, Michael. The Raw Prototype Design Document V5.01 [online]. Department of Electrical Engineering and Computer Science, Massachusetts Institute of Technology, Sep. 6, 2004 [retrieved on Sep. 25, 2006]. Retrieved from the Internet: <ftp://ftp.cag.lcs.mit.edu/pub/raw/documents/RawSpec99.pdf>.

Moritz, Csaba Andras et. al., "Hot Pages: Software Caching for Raw Microprocessors," *MIT/LCS Technical Memo LCS-TM-599*, Aug. 1999.

USPTO Final Office Action in U.S. Appl. No. 11/302,956, mailed Oct. 18, 2007, 53 pages.

Wenbin Yao, Dongsheng Wang, Weimin Zheng, and Songliu Guo, "Architecture Design of a Single-chip Multiprocessor", Proceedings of the International Conference on High Performance Computing and Applications, Aug. 8-10, 2004, Shanghai, P.R. China.

Anant Agarwal, Richard Simoni, John Hennessy, and Mark Horowitz. "An Evaluation of Directory Schemes for Cache Coherence." In Proceedings of the 15th Annual Symposium on Computer Architecture, Jun. 1988, ACM, SIGARCH.

David Chaiken, John Kubiatowicz, and Anant Agarwal. "LimitLESS Directories: A Scalable Cache Coherence Scheme" Proceedings of ASPLOS-IV, Apr. 1991.

David Lars Chaiken, MS thesis, MIT 1990.

Chang, J. and Sohi, G. S. Cooperative Caching for Chip Multiprocessors. In Proceedings of the 33rd Annual international Symposium on Computer Architecture (Jun. 17-21, 2006). International Symposium on Computer Architecture (ISCA). IEEE Computer Society, Washington, DC, 264-276.

S. Kaneko et al. A 600mhz single-chip multiprocessor with 4.8gb/s internal shared pipelined bus and 512kb internal memory. IEEE Journal of Solid-State Circuits, 39(1):184-193, 2004.

Luiz André Barroso, Kourosh Gharachorloo, Robert McNamara, Andreas Nowatzyk, Shaz Qadeer, Barton Sano, Scott Smith, Robert Stets, and Ben Verghese. Piranha: A Scalable Architecture Based on Single-Chip Multiprocessing. In Proceedings of the 27th ACM International Symposium on Computer Architecture. Vancouver, CA, Jun. 2000.

Speight, E., Shafi, H., Zhang, L., and Rajamony, R. 2005. Adaptive Mechanisms and Policies for Managing Cache Hierarchies in Chip Multiprocessors. SIGARCH Comput. Archit. News 33, 2 (May 2005), 346-356.

Takahashi, M., Takano, H., Kaneko, F., and Suzuki, S. 1996. A Shared-bus Control Mechanism and a Cache Coherence Protocol for a High-performance On-chip Multiprocessor. In Proceedings of the 2nd IEEE Symposium on High-Performance Computer Architecture (Feb. 3-7, 1996).

Donald Yeung, John Kubiatowicz, and Anant Agarwal. MGS: A Multigrain Shared Memory System. Proceedings of the 23rd Annual International Symposium on Computer Architecture, pp. 45-56, May 1996.

David Chaiken, Craig Fields, Kiyoshi Kurihara, and Anant Agarwal. "Directory-Based Cache-Coherence in Large-Scale Multiprocessors." IEEE Computer, Jun. 1990.

John Kubiatowicz, David Chaiken, and Anant Agarwal. Closing the Window of Vulnerability in Multiphase Memory Transactions. In ASPLOS 1992.

David Chaiken and Anant Agarwal, "Software-Extended Coherent Shared Memory: Performance and Cost," in Proceedings 21st Annual International Symposium on Computer Architecture (ISCA'94), Apr. 1994.

John Kubiatowicz, David Chaiken, Anant Agarwal, Arthur Altman, Jonathan Babb, David Kranz., Beng-Hong Lim, Ken Mackenzie, John Piscitello, and Donald Yeung. "The Alewife CMMU: Addressing the Multiprocessor Communications Gap," in Hotchips, Aug. 1994.

Anant Agarwal, Ricardo Bianchini, David Chaiken, Kirk Johnson, David Kranz, John Kubiatowicz, Beng-Hong Lim, Ken Mackenzie, and Donald Yeung, "The MIT Alewife Machine: Architecture and Performance," in Proceedings of the 22nd Annual International Symposium on Computer Architecture (ISCA'95), Jun. 1995.

Anant Agarwal, Ricardo Bianchini, David Chaiken, Fred Chong, Kirk Johnson, David Kranz, John Kubiatowicz, Beng-Hong Lim, Ken Mackenzie, and Donald Yeung, "The MIT Alewife Machine: Architecture and Performance," in Proceedings of the IEEE, Mar. 1999.

Levente Jakab, MS thesis, MIT 2004.

Satish Ramaswamy, MS thesis, MIT 2005.

Yamawaki, Akira et al. "Coherence Maintenances to realize an efficient parallel processing for a Cache Memory with Synchronization on a Chip-Multiprocessor," in Proceedings of the 8th Symposium on Parallel Architectures, Algorithms and Networks (ISPAN'05), 2005 IEEE.

"MESI protocol," from Wikipedia, 2 pages.

Suh, Taeweon et al., "Supporting Cache Coherence in Heterogeneous Multiprocessor Systems." Proceedings of the Conference on Design, Automation and Test in Europe, 2004, 6 pages.

\* cited by examiner

CACHING IN MULTICORE AND MULTIPROCESSOR ARCHITECTURES

CROSS-REFERENCE TO RELATED APPLICATIONS

This application is a continuation of U.S. application Ser. No. 13/190,035, filed on Jul. 25, 2011, titled "CACHING IN MULTICORE AND MULTIPROCESSOR ARCHITECTURES," (now U.S. Pat. No. 8,234,451) which is a continuation of U.S. application Ser. No. 12/966,686, filed on Dec. 13, 2010, titled "CACHING IN MULTICORE AND MULTIPROCESSOR ARCHITECTURES," (now U.S. Pat. No. 7,987,321) which is a continuation of U.S. application Ser. No. 11/754,162, filed on May 25, 2007, titled "CACHING IN MULTICORE AND MULTIPROCESSOR ARCHITECTURES," (now U.S. Pat. No. 7,853,755) which claims the benefit of U.S. Provisional Application No. 60/827,473, filed on Sep. 29, 2006, titled "PROXY CACHING IN MULTICORE AND MULTIPROCESSOR ARCHITECTURES," and U.S. Provisional Application No. 60/882,318, filed on Dec. 28, 2006, titled "TRANSFERRING AND STORING DATA IN MULTICORE AND MULTIPROCESSOR ARCHITECTURES," each of which is incorporated herein by reference.

BACKGROUND

This invention relates to caching in multicore and multiprocessor computers.

Cache coherence is a useful mechanism in multiple processor systems to provide a shared memory abstraction to the programmer. When multiple processors cache a given shared memory location, a cache coherence problem may arise because a copy of the same memory location exists in multiple caches. A cache coherence protocol guarantees that a given memory location has a consistent view across all processors. There are many models of what a consistent view is, and one example is sequential consistency. Another is weak ordering. In each of these models, the coherence protocol prescribes a legal order in which memory locations can be acquired by and updated by various processors.

Directory based protocols are one way of maintaining cache coherence. In many previous systems, a directory is maintained alongside main memory. For example, the directory state and directory controller are both implemented as part of main memory, which is off-chip, and there is directory state associated with each memory line (same size as a cache line, which corresponds to the unit in which memory is cached, also called a cache block). Thus in such examples, the directory state is proportional in size to main memory size. Typically, the directory controller is also associated with the memory controller, and often both are tightly coupled to each other. In the MIT Alewife machine, a multiprocessor computer which was operational in 1994 (e.g., described by Anant Agarwal, Ricardo Bianchini, David Chaiken, Fred Chong, Kirk Johnson, David Kranz, John Kubiatowicz, Beng-Hong Lim, Ken Mackenzie, and Donald Yeung, "The MIT Alewife Machine: Architecture and Performance," in Proceedings of the IEEE, March 1999, incorporated herein by reference), main memory was partitioned and each partition was associated with a corresponding one of the processor cores. As illustrated in FIG. 1, each of the nodes 100 in the machine corresponded to a core (e.g., core 1-core 3) that included a processor 102, its cache 104 (or caches, if there were multiple levels), and a portion 106 of main memory 108. The main memory was on a separate chip (e.g., typically implemented as DRAM). Each cache line sized memory line had a directory entry associated with it. The collection of directory entries for all memory lines in the memory portion 106 for a node was stored as a directory portion 110 for that node. A directory with portions from all the nodes was implemented typically in the same technology as the main memory itself (e.g., in DRAM) and each directory portion 110 was stored alongside the corresponding memory portion 106 in main memory 108. Thus, a given directory portion 110 and its associated processor 102 are on different chips.

Alewife distributed the directory along with the memory for all the nodes as depicted in FIG. 1. The directories stored the node numbers of the nodes on which a copy of a given memory line was stored as a cache line. This way, if some cache wanted to write a given line of data, then the directory would be queried and the cache lines storing that line of data could be invalidated in all the other caches.

Directory based cache coherence approaches are generally more scalable and hence may be preferable over other approaches, such as snoopy cache approaches, for large-scale architectures. Snoopy cache approaches generally need a bus to connect the various nodes in the system and each of the nodes broadcasts their requests over this medium. Each of the nodes also snoops on the bus and listens in on all the requests. Because of the need to broadcast and snoop on all main memory requests, the snooping cache schemes may not scale to more than a few cores in a multicore system.

The Alewife directory kept track of all or some of the locations (nodes) in which a given memory line was cached. The directory also kept some state which indicated the current state of the cache line, such as for example, whether it was dirty in a cache, and a number of outstanding acknowledgements for an issued transaction. The "directory state" includes the state information that tracks where cached copies are, and the status of various transactions. The "directory controller" includes the controller engines that implement the directory protocol. The term "directory" is generally used to refer to either or both the directory state and the directory controller depending on the context.

When a processor (or node) (for example, node 2) requested a cache line which was not present in its cache, node 2's cache would take a cache miss and the request would be sent directly to the main memory location corresponding to the cache line. A coherence controller or the directory controller attached to that memory would check the directory entry stored along with the memory location (in the directory state) and would determine the action to take based on the request and the current state of that memory location. In a common scenario, the controller would simply send the requested data from memory to the node requesting it. The controller would also update the corresponding directory state to reflect the fact that node 2 now has a readable copy of the line in its cache. FIG. 1 illustrates that this action took a local transaction (marked as 1) between a processor and cache, and two network transactions (marked as 2 and 3), one from the cache of node 2 to request the data from the memory portion 106 assigned to node 1, and one to receive the data from memory at the cache of node 2. These transactions are between a chip having the processor and cache of a node and a chip providing the main memory. The directory state stored in the directory portion 110 of node 1 includes pointers to nodes that store copies of the data from a given memory line.

In multiprocessors such as Alewife each of the nodes can be implemented on a single chip or multiple respective chips. The directory state was also large—its size was proportional to the size of main memory because each memory location stored a directory entry associated with it.

SUMMARY

This document relates to caching techniques, some or all of which apply equally well to a discrete system (not single chip) as well as to single chip systems such as a multicore processor. In a multicore processor, multiple nodes are on one chip. In the description below, the terms "multicore processor" are used interchangeably with terms such as "multicore chip," "tiled processor," or "chip multiprocessor" (CMP), unless otherwise indicated in their context.

In one aspect, in general, a multicore processor comprises a plurality of cache memories, and a plurality of processor cores, each associated with one of the cache memories. Each of at least some of the cache memories is configured to maintain at least a portion of the cache memory in which each cache line is dynamically managed as either local to the associated processor core or shared among multiple processor cores.

Aspects can include one or more of the following features.

Each of at least some of the cache memories is assigned as a home location for caching a corresponding portion of a main memory in cache lines that are shared among multiple processor cores.

The processor core associated with a given cache memory is configured to manage the local cache lines according to a first level in a cache hierarchy, and to manage the shared cache lines according to a second level in the cache hierarchy.

The second level is one level higher than the first level in the cache hierarchy.

The processor cores are configured to access a portion of the main memory at a given address according to the first level using a first portion of the address and to access a portion of the main memory at a given address according to the second level using a second portion of the address.

The processor cores are configured to access a portion of the main memory at a given address according to the first level using a first portion of the address if the address is not assigned a home location in a shared cache line, and using a second portion of the address if the address is assigned a home location in a shared cache line.

The processor cores are further configured to determine whether a given address is assigned a home location in a shared cache line by comparing an address associated with the processor core to a portion of the given address.

The granularity at which portions of the main memory are assigned to cache memories as a home location is individual cache lines.

The cache memory assigned as a home location for a cache line is determined by applying a function to a physical or virtual address associated with the cache line.

The granularity at which portions of the main memory are assigned to cache memories as a home location is configurable.

The processor cores are configured to determine whether a cache line in the associated cache memory is assigned as a home location of an address to be accessed, and if it is to access the address as a shared cache line.

A portion of the address used to index into the cache memory is the same for indexing data that is in a local cache line and for indexing data that is in a shared cache line.

A first portion of an address is used to index data that is in a local cache line, and the same portion of the address is used to index data that is in a shared cache line.

A first portion of an address is used to index data that is in a local cache line, and a second portion of an address is used to index data that is in a shared cache line.

The second portion of an address is smaller than the first portion of an address.

The processor core associated with a cache memory that is a home location for caching a corresponding portion of the main memory is configured to access data in the corresponding portion of the main memory using the second portion of the address of the data.

The processor core associated with a cache memory that is a home location for caching a corresponding portion of the main memory is configured to handle memory requests from other processor cores requesting access to the corresponding portion of the main memory.

Each of at least some of the cache memories is configured to store directory state information to dynamically manage data stored in a cache line that is shared among multiple processor cores.

The directory state information is stored in fields for respective cache lines in the cache memory.

Each cache memory is configured to use a write-through policy for writing copies of cache lines stored in the cache memory that are assigned a home location in a different cache memory.

Each cache memory is configured to use a no-write-allocate write miss policy for cache lines that are assigned a home location in a different cache memory.

Each request to write to a copy of a cache line stored in the cache memory is associated with an expected acknowledgment message.

A processor in the processor core is configured to stall after receiving a memory fence instruction until expected acknowledgement messages have been received.

Each cache memory is configured to use a write-back policy for writing copies of cache lines stored in the cache memory as the home location.

Each cache memory is configured to use a write-allocate write miss policy for cache lines that are assigned the cache memory as the home location.

The processor cores are configured to access a portion of the main memory at a given address by hashing the address according to a hash function to an index used to access a mapping table to obtain the home location of a cache line that includes the address.

Either or both of the hash function and the mapping table are configured to prevent one or more selected cache memories from being used as a home location.

Cache memories are assigned as home location for a given address based on a plurality of bits of the address.

The processor cores are configured to determine whether to perform an operation at a given memory address in a local cache line of the associated cache memory or to send the operation to be performed at a home location assigned to the given memory address in a shared cache line of a different cache memory, based on what operation is being performed.

The processor cores are configured to determine to perform or send the operation based on whether the operation is an atomic operation.

At least some of the cache memories are associated with a buffer used to store the most recent data value written to each of multiple addresses and are configured to overwrite previous values in the buffer until the values in the buffer are used to update a memory location.

The memory location is in a main memory.

The memory location is in one of the cache memories.

Copies of the data values in a given buffer that are cached as local to respective processor cores are invalidated when the values in the buffer are used to update the memory location.

The copies are invalidated using invalidate messages sent from the processor core associated with the buffer to the respective processor cores.

A first network interconnecting the processor cores is used to send invalidate messages, and a second network interconnecting the processor cores is used to send messages acknowledging the invalidate messages.

The processor core associated with the buffer is configured to expose data values from the buffer after acknowledgement messages have been received from the respective processor cores in response to the invalidate messages.

The values in the buffer are used to update the memory location when the buffer is full.

The values in the buffer are used to update the memory location in response to an instruction being received by the associated processor core.

Using the values in the buffer to update the memory location includes sending the data to a processor core associated with a cache memory that is assigned as a home location for the address associated with the data.

The processor core associated with the cache memory assigned as the home location is configured to merge data with data previously contained in a cache line corresponding to the data.

The processor core associated with the cache memory assigned as the home location is further configured to invalidate copies of the data values in the buffer that are cached as local to respective processor cores.

At least some of the cache memories are associated with storage for storing directory state for cache lines after the cache lines are evicted from the cache memory.

At least some of the cache memories are configured to replace one or more cache lines in the associated cache memory using directory information indicating whether data stored at the addresses are shared among multiple processor cores.

Each of at least some of the cache memories are configured to replace cache lines shared by fewer processor cores than other data stored in the cache memory.

Each of at least some of the cache memories are configured to replace a cache line that is not shared by multiple processor cores before replacing a cache line that is shared by multiple processor cores.

A first network interconnecting the processor cores is used to send invalidate messages, and a second network interconnecting the processor cores is used to send messages acknowledging the invalidate messages.

The first and second networks each have an independent physical communication medium.

The first and second networks share a common physical communication medium, and each has independent buffer resources.

The processor cores are interconnected over a network that includes at least one of: a bus, a ring, a mesh, a torus, a 3D cube, or a hypercube.

The processor further comprises one or more input/output modules configured to couple data between a cache memory and an input/output interface.

In another aspect, in general, a method is described for managing cache memories associated with respective processor cores in a multicore processor. The method comprises maintaining in each of at least some of the cache memories at least a portion of the cache memory in which each cache line is dynamically managed as either local to the associated processor core or shared among multiple processor cores.

Aspects can include one or more of the following advantages.

As illustrated in an example shown in FIG. 2, each of the nodes or "tiles" of the tiled processor 200 contains a processor and a cache. Each of the tiles does not necessarily correspond to a respective portion of main memory. In this example, a directory state and directory controller are in the path to main memory for each cache miss, so that each cache miss request is able to query the directory.

One approach for multicore cache coherence is for the directory state to be off-chip near the main memory. The onus of building a working cache coherence system then falls on the system designer—i.e., the designer that was building the system containing the multicore chip, rather than the designer of the multicore chip. Another issue with placing the directory off-chip is that directory checks need to go off-chip which may consume valuable pin bandwidth. To increase access speed and reduce bandwidth, some other approaches store directory state on-chip.

Another approach for multicore cache coherence uses a bus based or snooping cache approach in which all cache miss requests are broadcast in a way that all nodes can see them. Such an approach may not scale well to large numbers of processors. To reduce communication overhead, some other approaches limit communication associated with cache coherence to a subset of the nodes over a multidimensional interconnection network.

A further approach to caching for multicore chips addresses the directory problem within the multicore chip, and allows the system designer to use off-the-shelf DRAM and no specialized controllers for the main memory without having to worry about implementing cache coherence mechanisms outside of the multicore chip.

In one aspect, in general, a tiled processor (or multicore processor or chip multiprocessor) handles cache misses or certain other transactions from a given tile by sending them to a home tile (on the chip for multicore chips) which serves as a proxy for the directory for a corresponding portion of memory. The home tile for the portion of memory being accessed does not have to contain the memory being accessed. The home tile does contain a portion of the directory state that is related to the cache lines from the corresponding portion of memory cached in its cache. (Alternatively, the directory state contained on that tile is related to some region of memory). The home tile serves as a proxy tile that performs the directory actions for the corresponding portion of memory, accessing off-chip memory if needed. Off-chip memory is simply off the shelf DRAM, for example, DRAM can be on-chip as well.

In another aspect, in general, a tiled processor (or multicore processor or chip multiprocessor) handles cache misses or certain other transactions from a given tile by sending them to a home memory controller shim on the chip. The shim serves as a proxy for the directory for a corresponding portion of memory. The home memory controller shim does not have to contain the memory being accessed. Rather, it contains a portion of the directory that is related to the region of memory that the memory controller shim controls. The directory might further only contain directory entries for cache lines that are likely to be cached in at least one cache on the tiled processor. The directory controller on the shim performs the directory actions, accessing off-chip memory if needed. Off-chip memory is simply off the shelf DRAM, for example. DRAM can be on-chip as well.

In this scheme, storage space for directory state is only allocated for cache lines that might be contained in at least one cache in a tile on the tiled processor. Further, directory state can be further filtered to have storage space only for cache lines corresponding to shared data that might be contained in at least one cache in a tile on the tiled processor. This way, the scalable coherence solution using directories is completely self contained within the tiled processor (or multicore chip).

In another aspect, in general, a multicore processor has a directory and coherence controller that are associated with a memory shim and DRAM controller which are both present on-chip, while the DRAM and directory store are present off-chip.

Neighborhood and SNC caching techniques are used to find the home tile for a given cache line, SNC caching techniques provide a mechanism for a set of physical memory pages to be cached across the local on-chip cache memories of multiple tiles (or all the tiles), and are described in more detail, for example, in U.S. application Ser. No. 11/404,958, incorporated herein by reference. Some implementations of SNC techniques cache a given set of physical memory pages locally in the cache of exactly one tile, obviating the need to use cache coherence protocols to maintain cache coherence. Other implementations of SNC techniques are used to assign a home tile to a given set of physical memory pages, with the option of caching memory lines from those pages on other tiles. The home tile then implements and executes the directory cache coherence protocol.

Directory entries are associated with cache lines. Directory entries are operated upon when the corresponding cache line in the corresponding home tile is operated upon. For example, a directory entry is flushed when the cache line is flushed. When directory entry is flushed, all cached copies of the data (on other tiles) are invalidated. Thus, a cache line flush on a home tile causes a system wide coherence protocol to be executed. In implementations that use a multidimensional network such as the mesh network of the tiled architecture, the invalidation messages sent in the coherence protocol can be restricted to being sent to a subset of the caches, which limits the amount of traffic associated with the coherence protocol (e.g., as compared to a one dimensional broadcast network such as a bus or ring).

In at least some of the coherence schemes described in this document, the directory protocol switches modes during execution, commonly after the i-th reference to a cache line from some remote tile. For example, the directory might switch from a keeping i pointers, to keeping a broadcast bit. Or the directory might switch from managing the pointers in hardware, to trapping the processor on the home tile for software handling.

The directory entry associated with a cache contains state (e.g., a bit) which indicates whether future protocol actions require the directory to interrupt the local processor, or whether to handle the protocol in hardware.

Cores in the multicore chip (e.g., tiles in a tiled processor) can be configured as a home location to track similar numbers of cache entries. Load balancing can be performed by reapportioning directory state and related cache lines to other cores for serving as the home location if one home location is overloaded. This can be done for example by asking the operating system (OS) to mark a new home location for a given page.

In combination with any of the protocols described in this document, methods can be used to compress the directory state. Methods can include caching, or coarse grain directories (store directory state for a region of memory which is bigger than a cache line).

In another aspect, in general, a multicore processor includes multiple cache memories and multiple processor cores. Each processor core is associated with one of the cache memories (e.g., each processor core includes one of the cache memories coupled to an internal processor, and other cache memories may be located out side of the processor cores such as in shims at the periphery of the multicore processor). The processor also includes multiple memory interfaces (e.g., memory controllers or memory controller shims, as described in more detail below) providing memory access paths from the cache memories to a main memory.

In another aspect, in general, the directory controller and directory state are in a location that is on-chip and is separate from off-chip main memory.

In one example, the directory controllers (and directory state) are placed next to caches in each core on-chip in a multicore system. The directory state can be kept right next to each cache line.

In another example, the directory controllers and directory state are placed at the on-chip memory controllers in the path of main memory accesses from many cores. In either of these two examples, the directory controller and state are on the chip. Integration of the chip into a computing system does not have to involve implementing the directory controller and/or the directory state as part of system design near main memory.

In another aspect, in general, space is not provided for each memory line in the directory state on the chip. Rather, space is provided only for those memory lines that are actually stored on the chip in one of the caches. Thus, directory state is maintained only for each memory line that is actually cached on the chip. Hence, the space for the directories is independent of the amount of memory in the system.

In another aspect, in general, a common directory entry is used for all the cache lines in a given page or some larger region of memory than a cache line (or memory block). This provides compression of the directory state.

In another aspect, in general, the caches can be configured to maintain a portion of the cache memory that is local to the associated processor core and to maintain a portion of the cache memory that is shared among multiple processor cores. The portions that are local or shared can be assigned on-demand on a cache line bases, for example. State associated with the cache line can indicate whether it is local or shared. This flexibility enables the trade-off of space that is used for local vs. shared cache to be different for different processor cores.

Other features and advantages of the invention are apparent from the following description, and from the claims.

GLOSSARY

Figure 1:
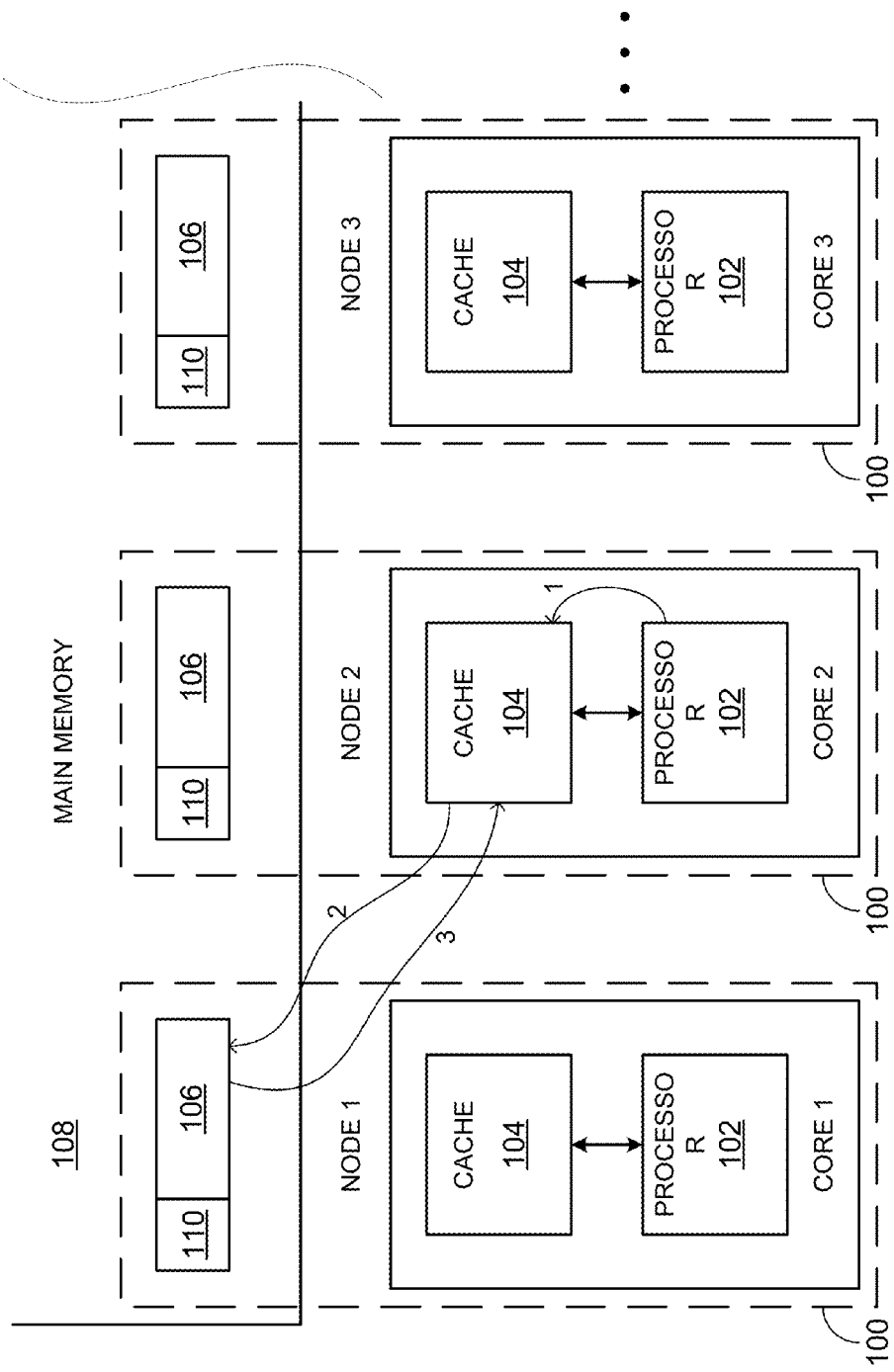
FIG. 1 is a diagram illustrating traditional directory based cache coherency.

FSM—Finite State Machine
SCC—Shim cache coherence

PCC—Proxy cache coherence
DRAM—Dynamic random access memory
SNC—Singly-cached
DCS—Directory cache store
DCMCS—Directory cache and memory cache store
MDN—Memory dynamic network
OODC—Optimistic on-demand coherence

DESCRIPTION

A class of multicore cache coherence techniques described in this document do not require implementing an entire cache directory (including directory state and directory controller) off-chip near main memory, or buses and frequent broadcasts. In this class of techniques, some or all of the information in one or more cache directories is stored at an intermediate location that is not main memory.

The storage for directory state includes directory entries that track the state of data from main memory that may be cached in various locations in the multicore processor. Each directory entry may store state information for a single cache line or, in some implementations, for multiple cache lines. A copy of a given memory line from main memory may be stored as a cache line in multiple locations. The coherence protocols ensure that the various copies are updated appropriately, as described herein.

A cache line typically includes multiple data values that can be individually updated. For example, when a data value in a cache is updated a new value is written into one of multiple locations in a cache line, and the other locations in the cache line, called "background data," may retain their previous values. In some cases, when data is written into a cache line, the background data is updated as well. For example, if the copy of the cache line being updated is not the most recent version, the background data may obtained from the memory line in main memory or from a dirty copy of the cache line (corresponding to the same memory line) in another cache. The address of a data value includes the address of the cache line containing the value and additional bit(s) to indicate which word (e.g., byte or some other unit) within the cache line corresponds to the value.

The directory can be located at a variety of places. In the examples described below, two of the places at which the directory for a given portion of memory is located are:

(1) A directory can be located at an on-chip memory interface or "shim" adjacent to an on-chip memory controller. This scheme is called shim cache coherence or the SCC scheme. In SCC, there can also be a higher level cache (e.g., L3 cache) which fronts the portion of main memory controlled by that shim. This cache could also be centralized and front all of main memory.

(2) A directory can be located on a node (e.g., a core or tile) in the multicore system. The directory can be associated with that node's higher level cache or the directory can be standalone by itself. This second scheme is called proxy cache coherence or PCC.

Another aspect of implementing cache coherence protocols in multicore architectures is managing levels of a hierarchical cache structure. A scheme for providing private local and shared global cache levels in a hierarchy leverages mechanisms such as SNC based load stores and TLB based redirecting of home locations of cache lines. The scheme uses write-through core caches and optional coalescing write buffers to achieve high performance while at the same time keeping the design complexity low. The scheme exploits the relaxed memory consistency model of the architecture to simplify the handling of writes, and treats the existing cache memory simultaneously as both a private local L2 cache and a distributed shared L3 cache. Shared addresses and memory locations are optionally allocated using a special memory allocation function such as shared malloc.

Other portions of a multicore processor that can potentially modify shared memory can also participate in the cache coherence protocols. For example, input/output (I/O) module coupled to the periphery of the interconnection network that connects the processor cores can be configured to participate in the SCC or PCC protocols. A scheme for providing I/O coherence is described in more detail below.

1. Shim Cache Coherence (SCC)

Figure 2:
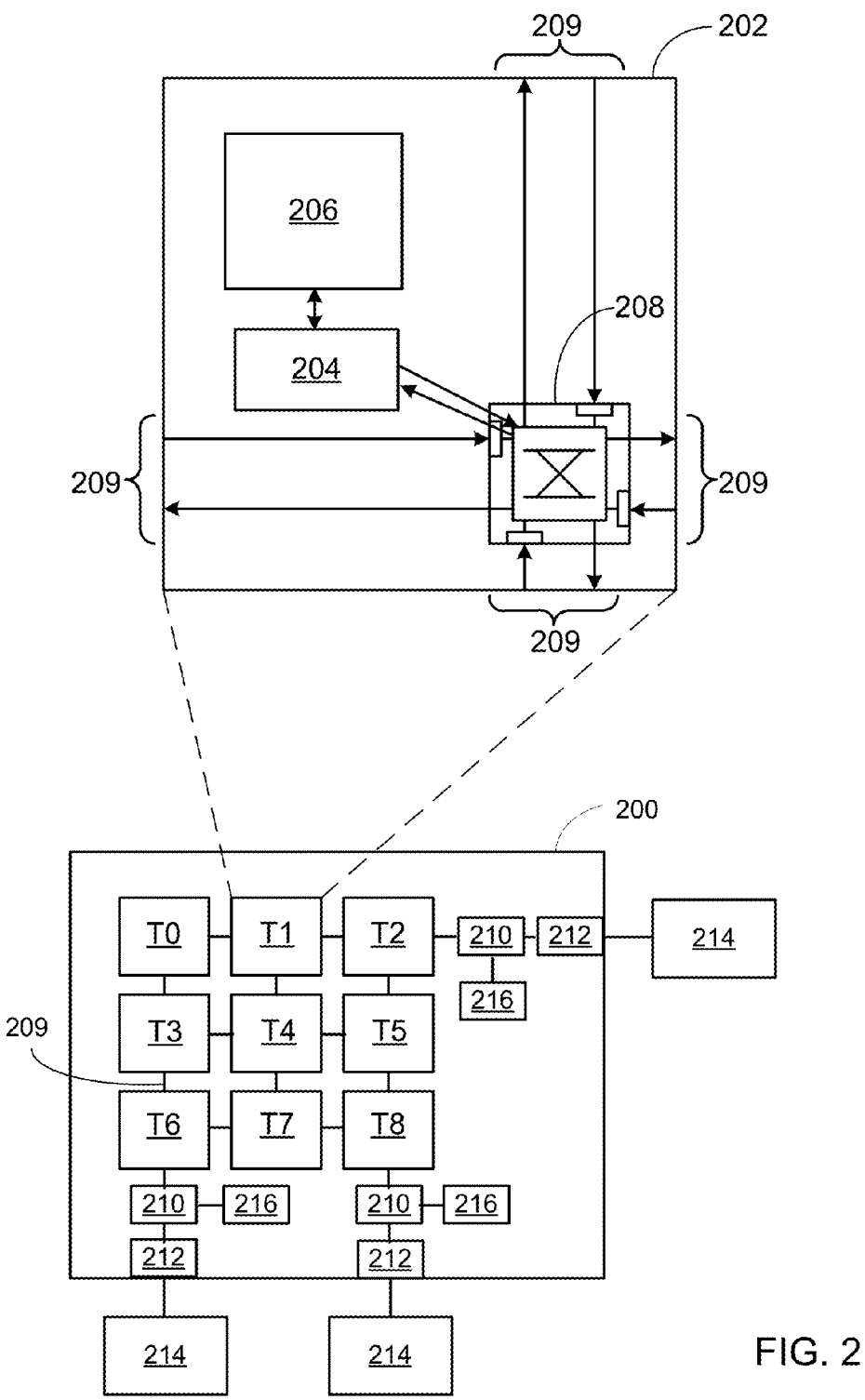
FIG. 2 is a diagram of illustrating a shim-based approach.

The SCC scheme applies to a wide range of multicore processor architectures as well as to multiprocessors in general. An exemplary multicore processor 200 having a tiled processor architecture is shown in FIG. 2. The figure shows 9 tiles (corresponding to the "processor cores" or simply "cores") numbered T0-T8, each tile 202 containing a processor 204 (or "processing engine"), a cache 206 and a switch 208. Also shown are data paths 209 of a mesh network connecting the tiles through the switches. In some tiled architectures the switch 208 can include multiple switching modules for different independent networks connecting the tiles, such as static networks (in which routing is controlled by statically programmed switch instructions) or dynamic networks (in which messages are dynamically routed at runtime). A memory dynamic network can be dedicated to routing messages associated with memory access. The memory coherence techniques can be applied to architectures with any type of network including a bus, a ring, a mesh, a torus, a 3D cube, a hypercube, or any other direct or indirect network.

In this example some of the network ports on switches at the periphery of the network pass through a shim 210 to a memory controller 212 built on-chip on the multicore processor 200. This memory controller 212 then controls a main memory module 214 which is located off-chip, in this example, DRAM modules. In FIG. 2, tiles T6, T8 and T2 are shown connected to DRAM modules through on-chip controllers 212. If a memory access request from a tile misses in its cache (e.g., the T0), then that request is forwarded toward an appropriate memory controller, for example the memory controller attached to the network near tile T6. The request is forwarded as a network message. The request passes through a shim 210 coupled to tile T6 prior to reaching the memory controller 212. The shim 210 translates the network message into a format that the memory controller 212 can process to access the main memory module 214, which is itself located off chip. In typical examples, the main memory module 214 controlled by each shim/memory controller is a portion of all of the system's physical memory. A translation lookaside buffer (TLB) or some other table or logic in each tile directs each memory access request (that has missed in the tile's cache) to a given shim or portion of main memory. (Such a TLB is described in pending U.S. application Ser. No. 11/404, 641 titled "MANAGING CACHE MEMORY IN A PARALLEL PROCESSING ENVIRONMENT," which is incorporated herein by reference).

In some examples, a directory coherence controller (DCC) 216 is located along with the shim 210 and the memory controller 212 (or DRAM controller) on the chip as illustrated in FIG. 2.

Figure 4:
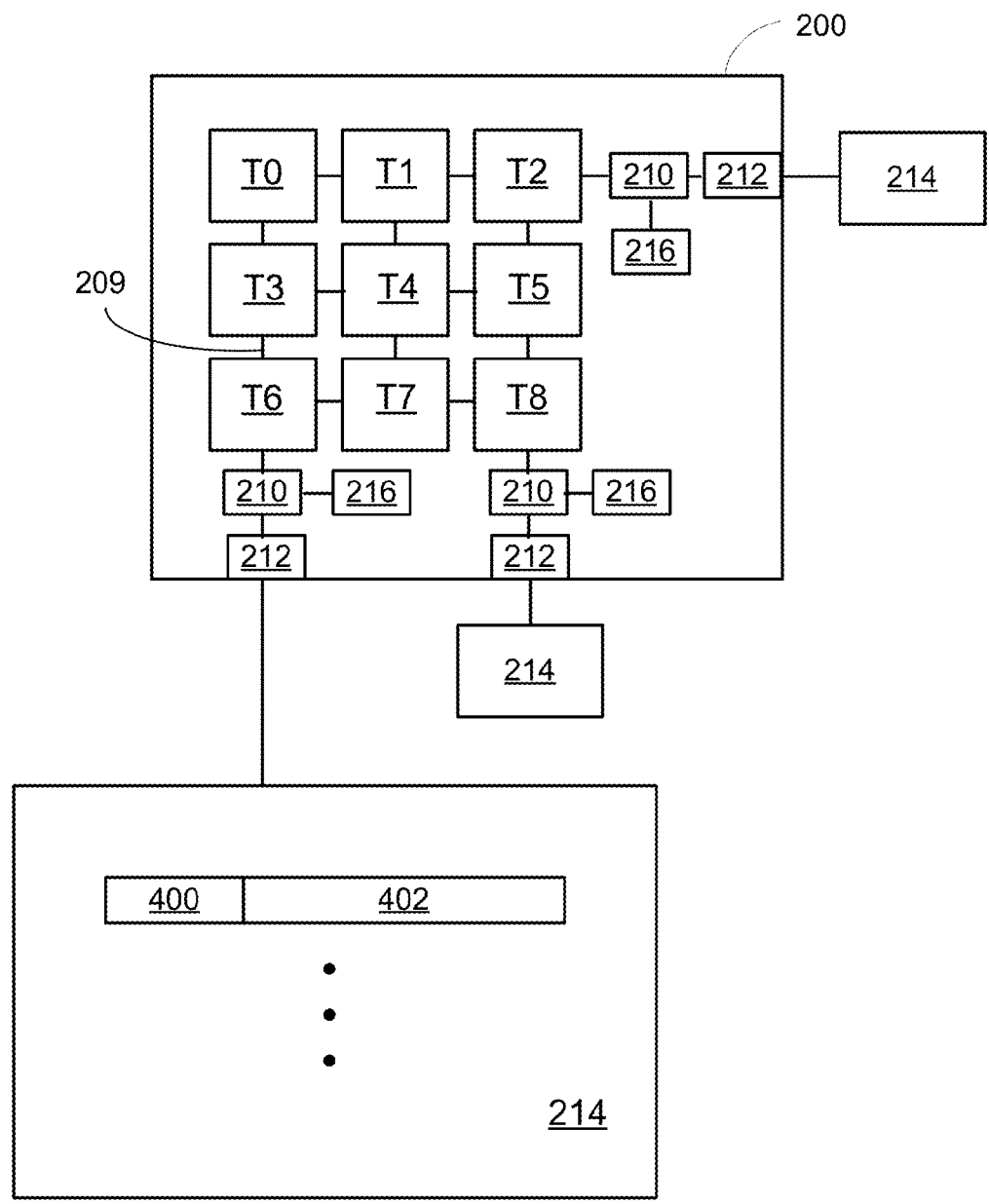
FIG. 4 is a diagram that illustrates directory state storage in main memory.

In some examples, the directory state entries are stored in DRAM in the same portion of the main memory that stores the data that associated with that directory (e.g., as illustrated in FIG. 4). For example, locations 0 through N−1 are DRAM data locations (byte addressed). Suppose that there is a directory entry associated with each 64 byte cache line, then locations N through N+(N/64−1)*D are directory entries associated with each 64 byte line in memory. D is the size of each directory entry. As shown in FIG. 4, the DCC 216 is coupled to the memory controller 212 through the shim 210, and enables the multicore processor 200 to accesses the directory state stored in the external main memory module 214. The DCC 216 is able to access the directory entry 400 corresponding to an associated cache line 402.

A feature of examples of the SCC approach is that all memory references to the given portion of main memory pass through that portion's shim to get to memory, so it is effective to locate the directory controller with the shim on the chip. In other words, the shim and the associated directory controller are the home location for all cache entries that are being supplied by the DRAM attached to this shim. The protocol is called SCC or shim cache coherence because the shim and associated logic serve as the home location for a set of cache lines.

1.1 Directory Cache Store (DCS) Scheme

Figure 3:
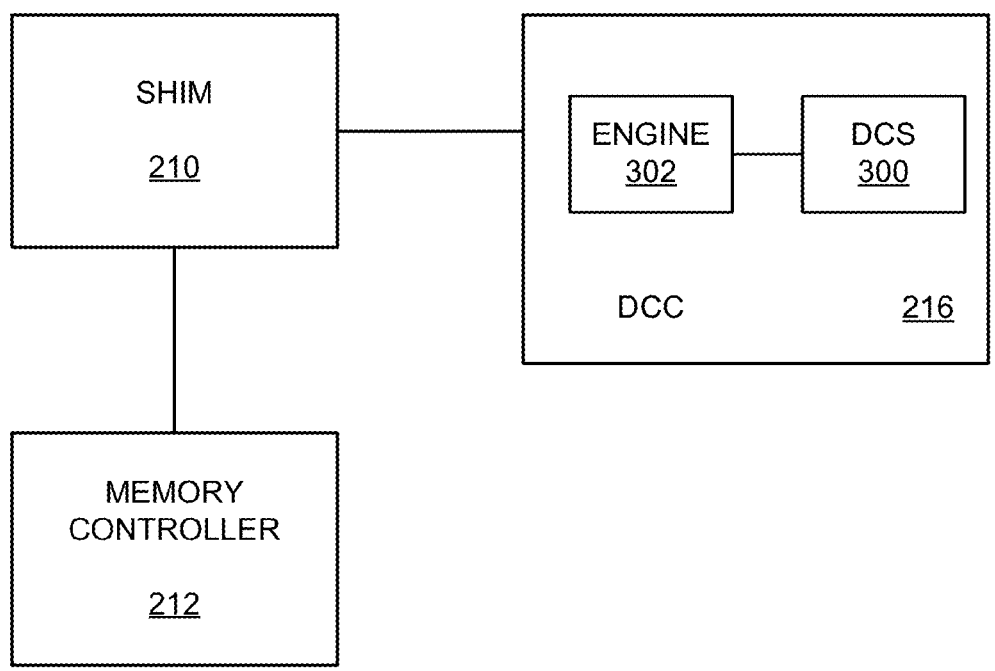
FIG. 3 is a diagram illustrating a directory cache store (DCS) approach.

In some examples, some amount of memory (e.g., SRAM or DRAM) is put on the multicore chip itself to hold a part of or all of the directory state, as shown in FIG. 3. Such an arrangement can speed up directory accesses. This memory is referred to as the directory cache store (DCS). In this example, the DCS 300 is part of a DCC 216 that is coupled to a shim 210. The DCS 300 is coupled to a directory engine 302 that maintains the DCS 300. In other implementations, the DCC 216 can be implemented in a tile coupled to the shim 210, an the processor 204 can serve as the engine and the cache 206 can serve as the DCS 300.

This DCS memory can be structured in a number of possible ways. In one way, it can be structured as a cache on all the directory entries related to the portion of main memory controlled by a corresponding shim. This directory cache can be, for example, direct mapped, fully associative, or set associative (e.g., two-way associative, 4-way, 8-way or greater-way associative). If the directory state is fronted by a directory cache, then there might be a directory miss (the directory entry associated with a cache line might not be contained in the DCS). In this case, the directory controller fetches the right directory entry from DRAM and replaces the entry in the directory cache.

DCS-Inclusive

The DCS scheme can further be optimized to store in the directory cache only directory state entries for those memory lines (cache lines) that are included in or contained in (or suspected of being contained in) at least one cache within the multicore chip. For example, a memory line that is considered to be included in a cache may be indicated as being stored in a cache though not actually stored in the cache at a given moment in time, or may be confirmed as actually being stored in a cache. Thus, there is a filter involved with the directory controller on the multicore chip which filters out (does not store) directory state information for memory lines that are not contained in any of the caches. For example, consider a main memory line called A stored in a given memory module. Initially no directory state is allocated for it on the multicore chip. When a first cache requests the data from that memory module, and if the directory controller determines optionally that the cache request is for a cache line within shared memory (which information may be, e.g., contained in the message from the cache, or it may be implicit in the address, or it may be in a memory map, or it may be a mode bit), then the directory controller allocates a directory state entry for it. Further requests from other caches will decorate this state entry further. To maintain the inclusive property, if the directory state store on the multicore chip becomes full, then a directory entry is evicted from the directory state. Before this is done, the corresponding tracked cache lines in the various caches are invalidated so the inclusive property holds. Invalidate messages can be sent over the on chip interconnect.

DCS-Noninclusive

In another variant of the DCS scheme, the DCS is allowed to save the directory in a main memory entry upon eviction when the directory cache becomes full. Permanent space can be allocated in main memory for this for each of the cache line sized chunks. Alternatively, some region of DRAM memory can be used to store these entries on an as needed basis. Thus, in some cases, the directory on chip might get a request from a cache that will require it to query the DRAM to obtain the directory state, if that state is not present in the directory on chip.

1.2 DCMCS Scheme

Figure 5:
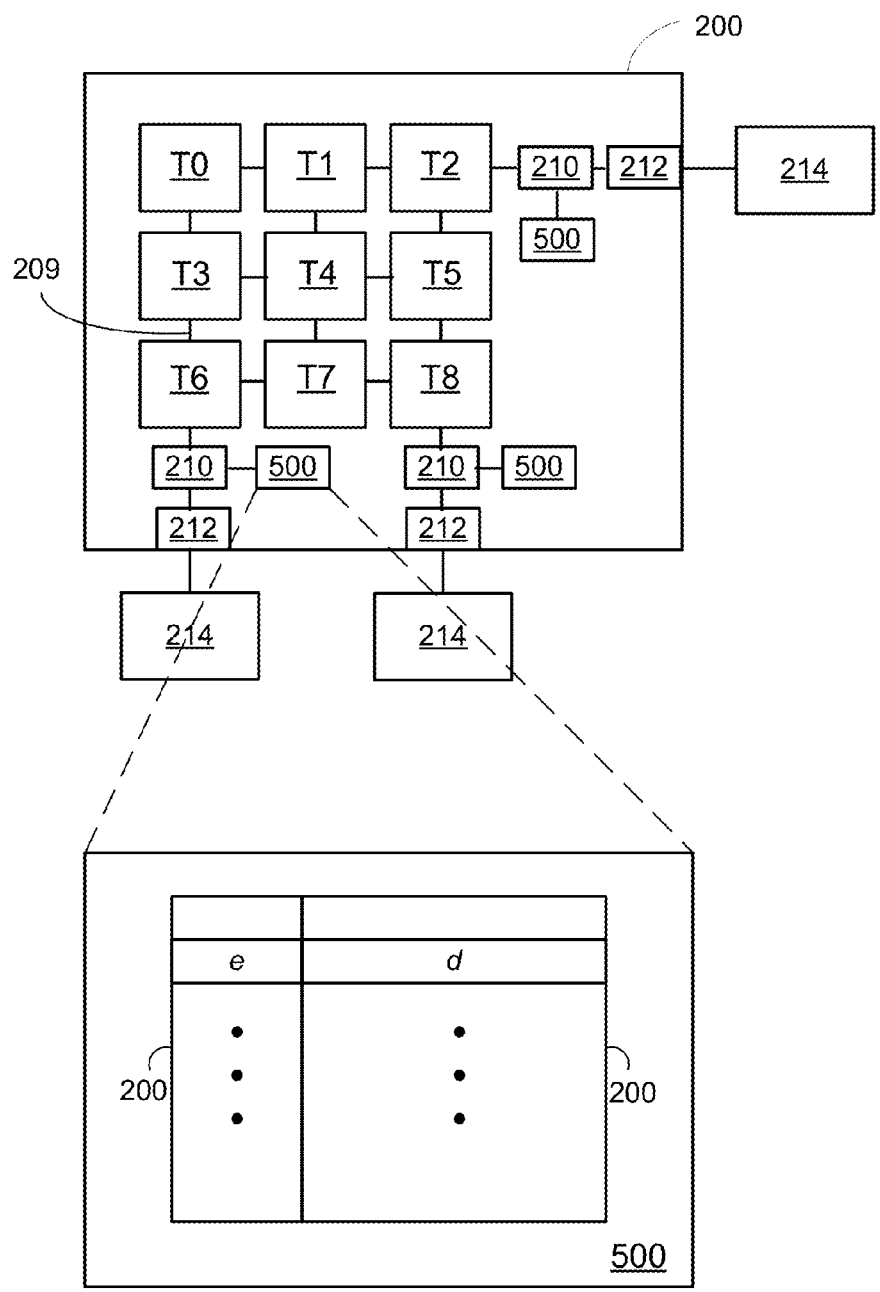
FIG. 5 is a diagram illustrating a directory cache and memory cache store (DCMCS) scheme.

In some examples, a multicore processor 200 includes a cache 500 associated with the shim 210 that stores data and directory entries, as shown in FIG. 5. For example, the cache 500 can serve as an L3 data cache, while each tile includes an L1 and L2 cache. In this example, both the directory entry e and the cache line data d associated with a given cache line address are stored in this cache 500 on the multicore processor 200. We call this scheme the DCMCS scheme, for Directory Cache and Memory Cache Store. Any request to memory that arrives at this shim 210 first queries the cache 500 using the stored directory entries in the cache 500 before going to a main memory module 214 (e.g., DRAM) off-chip. With DCMCS, in many cases the cache 500 can supply the cache line data as well as the directory state and completely eliminate an external DRAM transaction.

Coarse Grain Coherence:

In some examples, a common directory entry is used for all the cache lines in a given page or some larger region of memory than a cache line. This provides compression of the directory state. For example, two cache lines, or 4 cache lines, or 16 cache lines can have a common directory entry. In this case, the directory state table is accessed using the high order bits of the address—in other words, the directory state is accessed after some of the low order bits of the cache index are discarded. We can also have an entry for every cache line address that has the same low order bits—this way, for example, every Nth line in the memory system has a common directory entry. In this case, the directory state is accessed after a few of the high order bits of the address are discarded.

In other examples, a directory entry holds a pointer to each of the locations (or tiles) in which a given cache line resides. In these examples in which the directory entry controls more than a cache line, then the directory entry holds pointers to the tiles at which any of the cache lines in that page resides. So, the common directory entry is a superset of all the individual cache line directory entries. If any of those cache lines need to be written into by a tile, then all of the lines in the region need to be invalidated from the other tiles. In this way, there can be false sharing in this system, but the total directory state is smaller. The amount of cache memory for which there is a common directory entry is configurable, for example, in a special, purpose register (SPR) which is located in the shim or in each tile. This can be set by the operating system or by user software.

Each of the cache lines in the caches within the tiles also have some state (optionally) associated with them that indicates whether that cache line is exclusively cached in this cache, or whether it might be shared in other caches. In particular, each cache line maintains a read-only state in which the cache makes a request of the directory controller if the processor attempts to write the line. For caches without cache coherence, this transition from a read copy to a dirty copy can be made locally without requiring a memory transaction over the network. The tile's cache controllers are also able to handle directly in hardware certain types of messages that come in from the network—e.g., invalidate requests, which are a request to invalidate a given cache line. The controller in the tile is also able to perform the requested action, e.g., invalidate, but is also able to respond with another acknowledgement message which travels over the network to the shim controller. This invalidate/ack sequence can be done without involving the processor on that tile.

The shim has a controller that takes some actions when a message comes in from a tile. In some examples, the controller includes a hardware state machine. In some examples, the shim redirects the message to one of the tiles (commonly the tile closest to the shim) for software handling of the directory protocol. In some examples, a state bit in the shim indicates whether there is hardware support to handle the coherence processing through a controller, or whether the shim must forward the message to a tile for software handling.

Exemplary steps for maintaining cache coherence are these:

- On a cache miss (e.g., for a shared data read) on a tile, the miss goes through as a message through the network to the appropriate shim. The message encodes information such as (1) which tile it originated from, (2) what the cache line address is, (3) whether it is a read or a write, (4) whether a local copy of the data exists in the tile's cache already, (5) whether the request is for a shared data item. The message also encodes whether the message corresponds to an acknowledgement that some coherence action has been successfully undertaken by the tile. This action causes a first network message to go through.
- When the message is received at the shim, if the message corresponds to a shared location for which cache coherence must be dealt with, then the message is redirected to a tile for software handling (e.g., if the software coherence mode bit is set by a previous message), or otherwise it is then handled by the hardware directory controller (e.g., the DCC in the shim).
- The directory controller on the multicore chip then reads the state memory (either the DCS if it exists, or the DRAM directly) for the directory state corresponding to the cache line.
- If the directory indicates that the line is not dirty in some tile's cache, then the directory controller will add a pointer (or a bit, or some other state information) in the directory state entry indicating that a new tile now has a copy as well. (Recall that we are considering the ease of a read request). The directory controller will then get the cache line data either from the L3 cache on the chip (assuming that each tile has an L1 and an L2 cache, there might be common L3 caches near each of the memory controller shims that cache data from the memory controlled by that shim), or from main memory if there is no L3 cache on-chip. The directory controller will then send a message with the data to the appropriate tile. This causes a second network message to go through. Note that in the SCC scheme, for read cache misses that are clean everywhere, there are typically two network transactions.
- For a write request, actions similar to those described in the previous bullet take place. The differences include the following. If a cache line is previously maked as clean (or equivalently, not marked as dirty), the directory controller will first send out invalidations to all the caches (or a broadcast invalidate, depending on the protocol in use) and collect acknowledgements. The directory controller will then enter a pointer to the cache requesting the write copy and mark the state as exclusive and dirty. The directory controller will also send the data and appropriate notification to the requesting cache.

If the directory protocol is being handled by a tile in software, then the directory state can be stored in regular memory accessible to that tile. The tile can process the directory entries much like regular data, and can even cache the entries in its cache. In this way, it can make use of techniques such as those used in Alewife for software directory management.

In particular, if a tile is handling the directory protocol partly in software, and if the tile is storing the directory entries in its cache, it could be possible that it might miss in its own cache and need to go to DRAM. In some such examples, this tile uses a different network to prevent deadlock. For instance, if the normal directory protocols are handled on the memory dynamic network (MDN), then the requests of the directory tile can be sent over a second dynamic network called the M2DN.

In some protocols, the directory also maintains a counter for each directory entry/cache line to count the number of outstanding acknowledgements it must receive associated with that cache line. The directory can maintain a counter for all possible directory entries. Alternatively, the directory can maintain a single counter, and restrict only one outstanding transaction (for which acknowledgements are to be received) at a time.

A processor can also maintain a small number of transaction buffers associated with the directory controller at the shim. The number of such buffers can be 1, 2, 8, 16 or 64, for example. Each buffer entry can correspond to ongoing transactions associated with a cache line. Each buffer entry can maintain a count of outstanding transactions. This allows some small number of outstanding transactions, without inordinately increasing the size of the directory cache store DCS in the chip. The transaction buffer entries are tagged with the address of the cache line, so that the directory controller can access the state associated with the cache line.

A processor can also include a general purpose content addressable memory (CAM) in each tile. This can serve as the transaction buffer for the case that a tile (or tiles) is being used as the directory controller at the shim.

All types of directories, directory protocols, and techniques can be adapted for use with many of the techniques described herein. For example, the directories can implement full map directories, limited directories, limitless directories, coarse vector directories, limited directories with coarse vectors, etc. (See the paper "An Evaluation or Directory Schemes for Cache Coherence" by Agarwal et al in ISCA 1988, incorporated herein by reference, for a description of many of these techniques).

2. Proxy Cache Coherence (PCC)

Figure 6A:
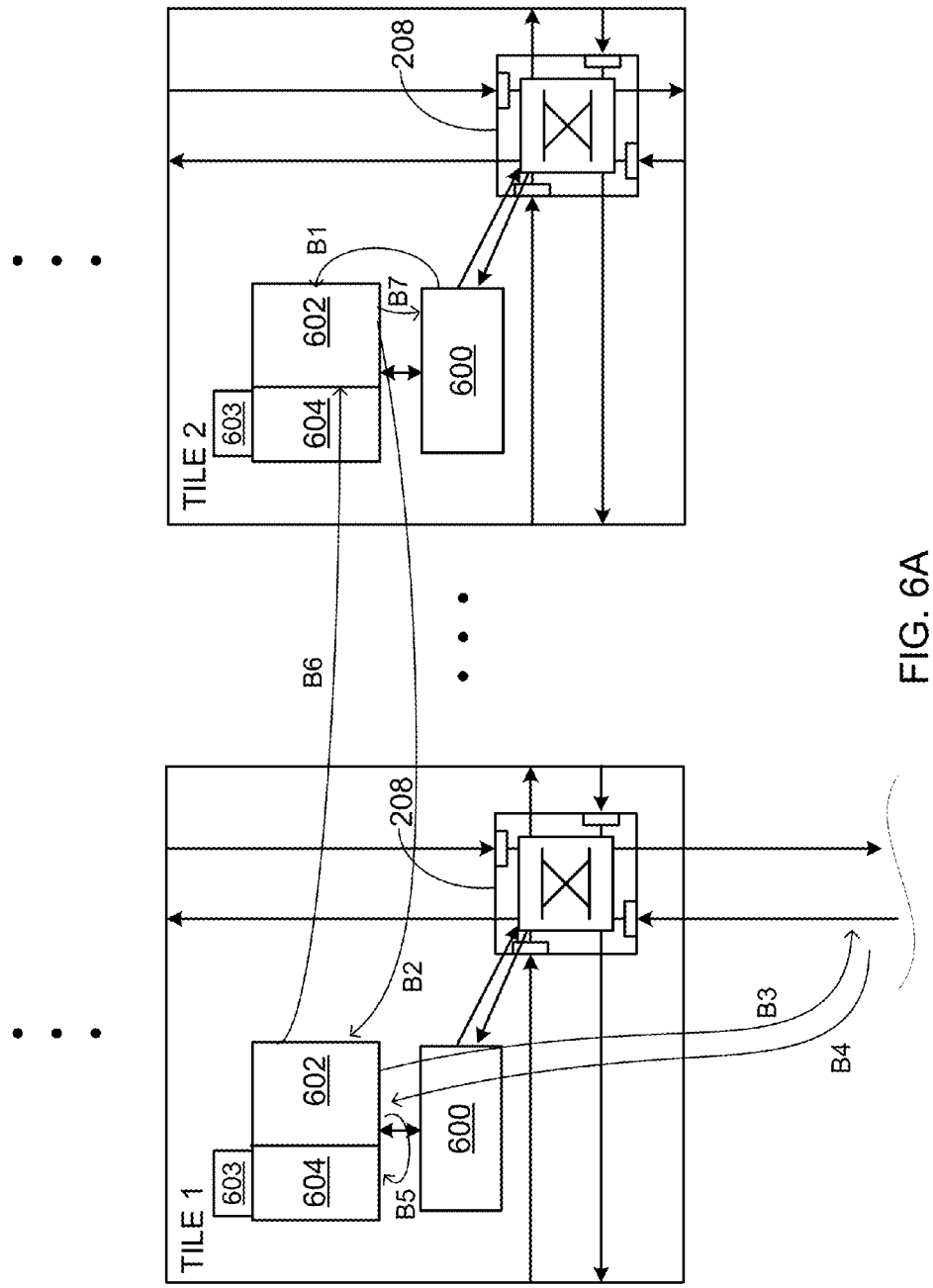
FIGS. 6A and 6B are diagrams that illustrates a proxy cache coherence (PCC) scheme.
Figure 6B:
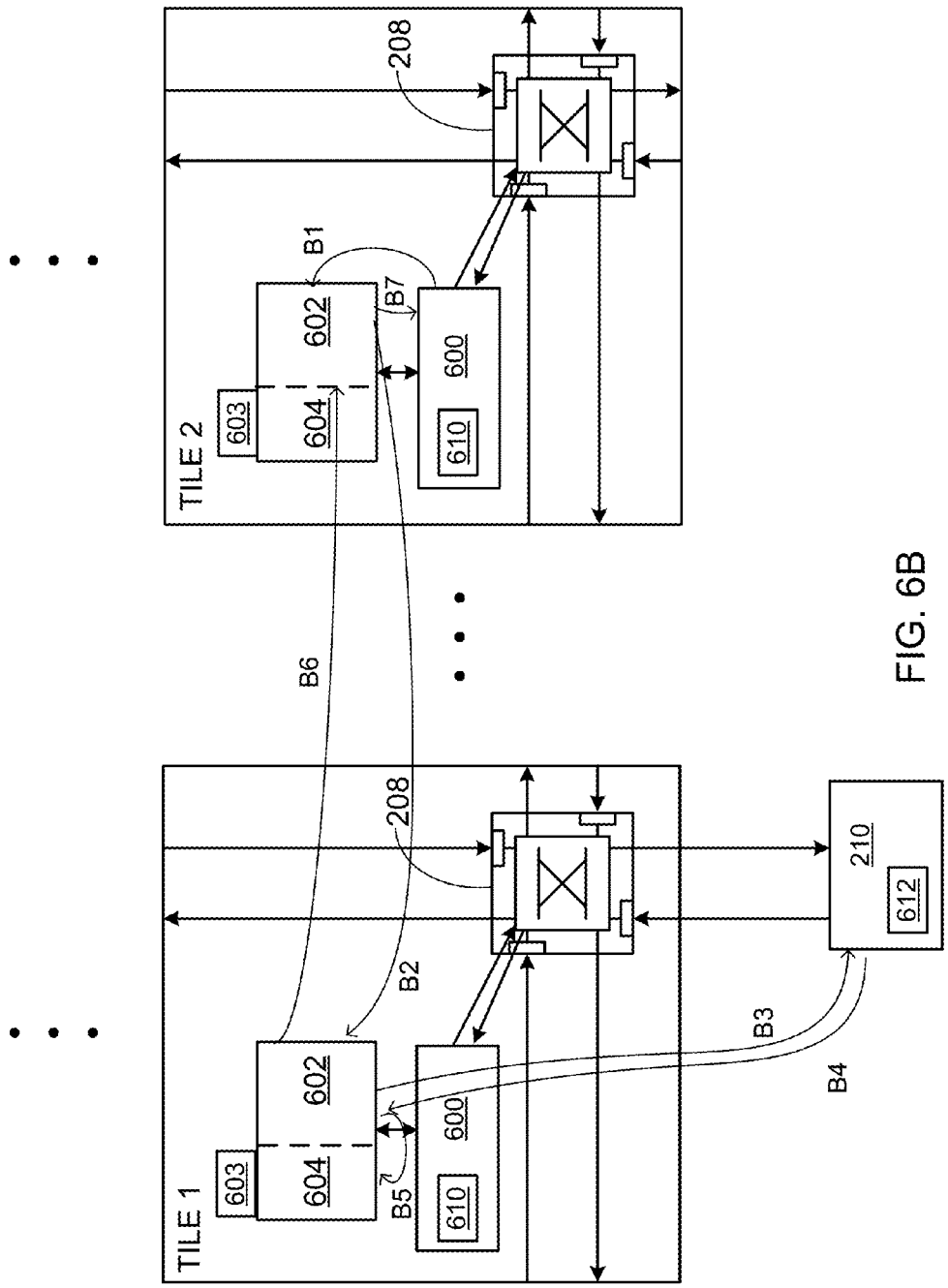

The proxy cache coherence approach or PCC works in a similar manner to the SCC method described above. One difference is that the home location for cache lines are not the shims, but rather other tiles, as illustrated in FIGS. 6A and 6B. In PCC, the tile that serves as a home location for a given cache line is called the proxy tile. Because the proxy tile serves as the proxy for the directory memory, the scheme is called proxy cache coherence or PCC.

Referring to FIG. 6A, each of the tiles (e.g., tile 1 and tile 2) that are used as home tiles for a given portion of main memory includes a processor 600 coupled to a cache 602 (e.g., providing an L2 cache to back an L1 cache that is integrated into the processor 600). A directory storage 604 for directory state can be included within the same memory that provides the cache 602, or can be included in a separate memory module on the tile. In some implementations, directory entries can be stored along side cache tags for a given memory line. A directory controller 603 is coupled to the directory storage 604.

Figures 7A, 7B, 7C:
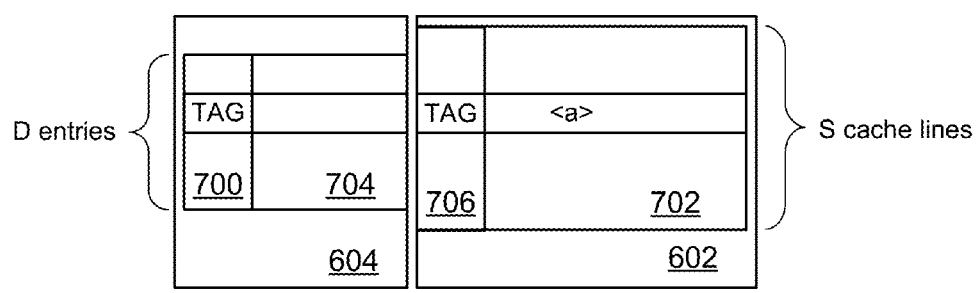
FIG. 7A-7C are diagrams that illustrate directory state storage in a tile.

FIG. 7A shows an example of an arrangement of a directory storage 604 in a memory providing a cache 602 of a tile. A tag section 700 includes a tag for each cache line, a data section 702 includes the content <a> of the cache lines, and the directory state section 704 includes directory state in the form of a bit for each of n cache memories in the multicore processor that may store a copy of the given cache line. In this arrangement, there is one directory entry for each cache line. Alternatively, the number of bits in the directory state can be n−1, because the bit denoting the current cache is not needed, since the cache tags indicate whether the line is present in the current cache.

FIG. 7B shows another example of an arrangement of a directory storage 604 in a memory providing a cache 602 of a tile. In this arrangement the directory state in the directory state section 704 maintains i pointers to cache memories that store a copy of the given cache line (where i<n). Each pointer is ceiling($\log_2(n)$) bits long, where ceiling(x) indicates the smallest integer which is greater than or equal to x. There is also a broadcast bit B that is stored for each cache line for cases in which a given cache line is shared by more than i other tiles. Optionally, the directory state can also include a bit that indicates that the directory has been extended into software according to the LimitLESS directory coherence scheme (see for example, David Chaiken, John Kubiatowicz, and Anant Agarwal. "LimitLESS Directories: A Scalable Cache Coherence Scheme." In Proceedings of the Fourth International Conference on Architectural Support for Programming Languages and Operating Systems, pages 224-234. ACM, April 1991, incorporated herein by reference).

FIG. 7C shows another example of an arrangement of a directory storage 604 in a memory providing a cache 602 of a tile. In this arrangement, there are fewer directory entries (D entries) in the directory state section 704 than cache lines (S cache lines) in the data section 702. The data section 702 is associated with a separate tag section 706. In this example, the directory storage 604 behaves as a cache on the directory space, and the tag section 700 for the directory storage stores information to indicate which cache line the directory state is representing.

In some implementations, if the cache containing the directory is the L2 cache, for example, the directory sharer bits can be used to track the sets/ways in the lower level cache (e.g., L1 data) that could be caching the corresponding L2 line. This will reduce the number of L1 lines that must be checked or invalidated when an L2 block is invalidated.

Figure 8:
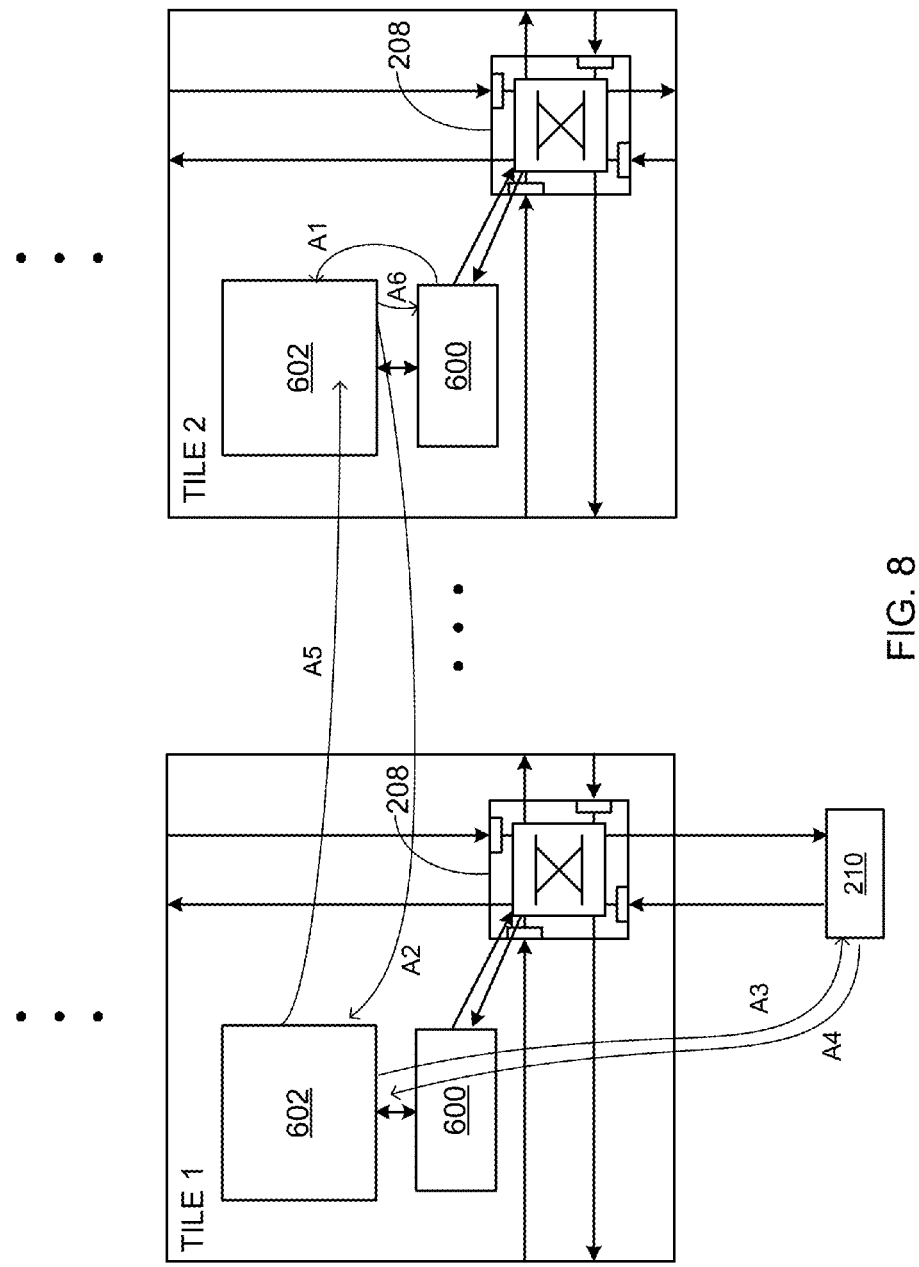
FIG. 8 is a diagram that illustrates a neighborhood caching and SNC protocol.

The PCC scheme can be viewed as an extension over the neighborhood caching and SNC protocols (e.g., described in co-pending U.S. application Ser. No. 11/404,641, titled "MANAGING CACHE MEMORY IN A PARALLEL PROCESSING ENVIRONMENT,"). FIG. 8 illustrates an example of neighborhood caching and SNC protocols. Interactions between tiles (e.g., tile 1 and tile 2) and a shim 210 on a tiled processor include actions in which an address a and contents <a> are transmitted over an interconnection network. In neighborhood caching and SNC protocols, when a memory request for access to address a misses in the local cache 602 (for example, of tile 2) and denoted as action A1 in FIG. 8, the request is not sent to main memory directly. Rather the request is sent to another tile (for example, tile 1) denoted as action A2. The tile to which the request is sent (tile 1 in this example—which we refer to as the home tile) is typically in the same vicinity or neighborhood of the requesting tile, but this is not necessary.

Various techniques can be used to assign a given tile as the home location (e.g., home tile) for a given memory line (e.g., having address a). In some implementations, the operating system (or a hypervisor) determines the mapping of memory line addresses to home tiles (e.g., according to a stored mapping table). The home tile for a given memory line can be indicated on a page basis by a TLB coupled to a processor such that addresses on a given page are assigned to the same home tile. The home tile assigned to a given address a can also be based on a function of the address such as a hash function. The home the assignment can also be round robin interleaved by memory line. For example, the TLB (along with other hardware in the tile) can use the low order bits (or, in general, some set of bits) of the memory line to determine where the home tile is (thus, the memory lines cached in a given home tile may have one or more bits at specified positions in common). The address a used to map a memory line to a home tile can be a physical address or a virtual address. In some implementations, a possible home tile assignment can be filtered according to a list of "do not use" tile locations, for example, by looking up the possible home tile in a CAM or special purpose registers. These tiles may be reserved for other purposes (e.g., for I/O functions) and may not be available as home tile locations. The reserved tiles can be indicated by having the OS or hypervisor write into special purpose registers, which are read by the CAM or mapping table.

In response to a memory request, the home tile supplies the data contained in the address a (the relevant cache line denoted as <a>) to the requesting tile 2 if tile 1 has that cache line in its cache. If it does not, then tile 1 acts as a proxy for tile 2 and sends the request for address a to main memory (DRAM) (denoted as action A3). Main memory supplies the data <a> to tile 2 (denoted as action A4). Then tile 2 supplies the data to the cache 602 of tile 1 (denoted as action A5). The cache 602 then supplies the data to the processor 600 (action A6). In neighborhood caching, the data may or may not be stored in the cache of the request tile, Tile 2. Further, no record is made of this access in the home tile, Tile 1. In this way, the other caches in the system serve as a higher level cache for Tile 2.

Note that in this case, what was previously 2 network transactions (when the request went directly to main memory as illustrated in FIG. 1) has now become 4 network transactions. However, when the home tile has the data in its cache, the request to main memory can be eliminated. On-chip traffic is much less expensive both in terms of bandwidth, latency and power, than off-chip traffic. Furthermore, notice that once the home tile has the data, it can further supply the data to other tiles (e.g., tile 3) without having to go to main memory.

In the PCC scheme, much like in the DCMCS variant of the SCC scheme described above, the associated directory state can be stored along with each cache line in the home tile. For example, the directory state can be stored along with cache tags (which are used for determining whether there is a hit or miss) in a tag array. Alternatively, in an implementation similar to the DCS scheme, the directory for the home locations are distinct from the cache locations. In some implementations, a directory on a home tile can keep track of directory state for memory locations that are not related to the locations contained in the home tile's cache. Rather the memory locations for which directory state is stored can be a predefined set of memory locations. Each directory on a tile can be responsible for the directory state associated with a different contiguous region of main memory.

In some implementations, as described in more detail below in the section on private/shared cache hierarchy, a cache memory can include some private (L2) cache entries that are copies of data whose home location may be on a different tile, and some shared (L3) cache entries whose home location is on the tile. The directory state stored on the tile may be directory state for the memory locations homed on that tile, and not associated with the private local cache entries.

One difference between the PCC and SCC schemes is that in the SCC scheme requests that needed further transactions to DRAM could go directly to the memory controller attached to the shim. In the PCC scheme, transactions that need access to DRAM data state or directory state, are sent over the network as a message to the appropriate shim. The shim in this case is, for example, a memory shim that does not need to have processing circuitry associated with directory protocols. The directory protocols are handled by the directory controller on the home tile. Further, there is no need for data storage at the shim, since the existing caches serve as the data storage facility, thereby saving space.

Variants of SCC apply to PCC as well. For example, the protocol can be handled in hardware or in software, or as a hybrid (combination of hardware and software). If the protocol is handled in software, the processor on the home tile can be interrupted to perform protocol actions. Alternatively, the protocol can be handled in a second processor on the home tile configured to run protocol software to perform protocol actions. Alternatively, the directory controller can be implemented in hardware on each tile that includes dedicated circuitry configured to perform protocol actions.

An example of the protocol handling for PCC is depicted in FIGS. 6A and 6B and is discussed next. Referring to FIGS. 6A and 6B, the steps for maintaining cache coherence in this example are as follows.

On tile 2, a processor 600 attempts to read data at address a from its cache 602 (action B1). The cache 602 may be serving as an L2 cache after a miss in an L1 cache within the processor 600. After a cache miss (e.g., for a shared data read) on tile 2, the miss goes through as a message through the network to the home tile, tile 1 (action B2). (As described above, the home tile can be indicated by the TLB or some other method). The message encodes information such as (1) which tile it originated from, (2) what the cache line address is, (3) whether it is a read or a write, (4) whether a local copy of the data exists in the tile's cache already, (5) whether the request is for a shared data item. The message might also encode whether the message corresponds to an acknowledgement that some coherence action has been successfully undertaken by the tile. This action might cause a first network message to go through. (For local data, the home tile might commonly simply be listed as the current tile itself, tile 2. The home tile can also be the same tile for shared data, although it is a rarer than for local data). In this case, on a cache miss, the controller can go directly to main memory, and there is not need to go to a separate home tile.

When the message is received at tile 1, if the message corresponds to a shared location for which cache coherence must be dealt with, then the message is redirected to the local processor for software handling (e.g., if the software coherence mode bit is set on the tile), or otherwise it is then handled by the directory controller in hardware. Note that coherence actions need not be taken for data that is not marked as one for which coherence is desired.

The directory controller on tile 1 of the multicore chip then reads the state memory for the directory state corresponding to the cache line. Directory state might be associated with each cache line in the cache of tile 1. (In this case, if the cache line is ever evicted, then the directory controller might cause all the copies of the line on other tiles on the chip to be invalidated).

In some cases, the cache of tile 1 contains a copy of that cache line. If the directory states that the line is not dirty in someone's cache, then the directory will add a pointer (or a bit, or some other form of state information) in the directory entry indicating that a new tile (tile 2) now has a copy as well. The directory controller will then (usually) get the cache line data from its own cache (L1 or L2 cache on its own tile) and then send a message with the data to the appropriate tile (tile 2 in this case). This causes a second network message to go through. Note that in the SCC scheme, for read cache misses that are clean everywhere, there are typically two network transactions.

In the case illustrated in FIG. 6A, the cache line is not present in the cache of tile 1. In this case the tile 1 sends a message to the memory controller responsible for that cache line asking for the line. If there is a common L3 cache in the system near the memory controller shim, then the request can be satisfied by the L3, and if the L3 does not exist, then the request is satisfied by the main memory (action B3).

The case illustrated in FIG. 6B is similar to the case illustrated in FIG. 6A, but shows additional levels in the cache hierarchy. The processor 600 in each of the tiles includes an L1 cache 610 that is accessed first. After a miss in the L1 cache 610, action B1 on tile 2 attempts to access the cache 602 on tile 2 as an L2 access. The access of action B2 to the home tile's cache 602 in tile 1 is the L3 access for tile 2 after a miss from the L2 access of action B1. The multicore processor can also include an optional L4 cache 612 in the shim 210 as shown, where the action B3 in this case checks the L4 cache 612 before going to main memory. Thus, the cache 602 can serve as both a local L2 cache for the local tile and as a shared L3 cache for other tiles, as described in more detail below, such that for an access to location a from Tile 1, the cache 602 on tile 1 will serve as the L2 cache for that access.

The data comes back to tile 1 from the memory controller (or L4 cache) (action B4), and the directory controller then updates the directory storage 604 with tile 2's address (action B5).

The directory then sends the data value to tile 2 cache 602 (action B6), and the cache 602 sends the value to the processor 600 (action B7) and to an optional L1 cache. In this latter case, notice that there are two extra network transactions.

If the directory protocol is being handled by the tile in software, then the directory state can be stored in regular memory accessible to that tile. The tile can process the directory entries much like regular data, and can even cache the entries in its cache. In this way, it can make use of techniques such as those used in Alewife for software directory management. The protocol can also be handled using a partial hardware, partial software scheme as in Alewife.

In the PCC or the SCC protocol a variant called linked pointers can be used. In this scheme, all the pointers are not stored in a centralized location in the home location. Rather, one pointer is stored which points to the first cache (or core) that contains the shared-read copy of the data. That one pointer also tracks the location of the exclusively owned dirty copy of the data. (It might also allow both shared dirty copies and shared readers in update protocols). In the case where the one pointer points to a cache that contains the shared copy of the data, a second pointer in the cache (or associated with the cache) can also be used which further points to the next copy of the data and so on. The final copy can indicate that that was the end, or it can point back to the home location. If any cache evicts a shared copy in this scheme, an invalidate sequence is sent around the chain. Alternatively, each cache can maintain forwards and backwards pointers to shared copies. In this case, eviction does not require invalidating all entries, rather it requires patching up the previous and next sharers together.

The PCC protocol can also use all the mechanisms described in the SCC protocol.

3. SCC and PCC Alternatives

An alternative variant of the protocols described above is presented next. In the above SCC and PCC protocols, a data line can be cached by any cache and shared by any cache in the multicore chip or system. In the ensuing protocol, a cache line is allowed to be cached in a coherent manner only in a small subset of all the cores, e.g., 8.

As before, this protocol maintains cache coherence in a multicore (also referred to as a chip multiprocessor or CMP) processor, wherein the multiple processors each having private caches are connected together in a mesh, ring, bus or other network (direct or indirect) network. The protocol is architected to be both logically simple and easy to verify as well as inexpensive to support in hardware. The key features of the protocol are:

Cache coherence is maintained among small (for example, 2, 4, 8) groups of cores. This addresses the well-known snoop bandwidth issue, wherein snoopy protocols operating on a large system (i.e., many processors) place unreasonably high demands on interconnection networks. On a chip with more than 8 cores, it is envisioned that system software would group the cores into multiple, distinct coherence domains of up to 8 cores each.

The L2 cache tags of each processor are augmented with, for example, a 4 bit owner/shared field per cache block. (As discussed shortly, these bits will maintain the coherence state for the associated cache block, if this processor is the home location for that block). These bits either encode the unique owner of the cache block (if any) or are used to indicate that the block is shared by more than one processor. In other words, one bit might indicate whether there is a unique writer or whether the block is read shared. The other 3 bits encode a unique writer. Other encodings and numbers of state bits are also possible. For example, pointers to the shared read locations can be stored. Thus the design as described here differentiates only between one cacher/more than one cacher.

The translation buffers/page table entries are used to define a unique home processor for each shared page and an optional coherence domain "snoop mask" for a set of shared pages and processors. The snoop mask indicates which other cores might be involved in sharing, and hence must be snooped. The snoop mask may be a list of core numbers that must be snooped.

When a core C does a store to coherent page P, for cache block B, C sends the store to the home core H as indicated by the TLB entry for page P. Thus this is a store-through scheme. C also sends the 8 bit "snoop mask" field from the TLB (if the snoop mask is being implemented), which indicates the list of processors in the coherence domain that may need to be snooped. Home core H will perform the store, updating the cache block B in its L2 cache, and, if indicated by the owner/shared field for cache block B, will send invalidates to the sharers. Thus this protocol belongs to the family of write-through, invalidate-based family of cache coherent protocols. The store-through techniques can be used with either the PCC or the SCC protocols. Data that is stored or otherwise modified is sent to a home location (a core or a shim) to maintain the latest update at the home location.

Multiple cores may simultaneously execute stores to the same cache block B at the same time. Because there is a unique home H for each cache block B and because the home serializes accesses to the same address, a consistent view of memory is maintained.

On the displacement of an L2 block, the block is either written back to memory (if dirty) or dropped (if clean). No back invalidate needs to be performed. Thus the L2 cache is non-inclusive of the L1. This implies that on L2 misses (for loads or stores), the L1 caches must be invalidated for the requested block.

If data needs to be shared beyond the set of 8 processors, then various actions can be taken. A bit of state can be added called the broadcast bit, which is set when a processor outside of the 8 processors requests the data. In this case, a broadcast invalidate needs to be issued when anyone wants to write the data. This kind of protocol is denoted as $Dir_i B$ in the paper "An Evaluation of Directory Schemes for Cache Coherence" by Agarwal et al, in ISCA 1988. Dir stands for directory protocol, limited i stands for i entries in hardware, and B stands for broadcast invalidate beyond i. The broadcast can be implemented efficiently on tiled processors by using a hierarchical tree broadcast or a static network.

As another variant on the above, if more than the 8 processors defined in the sharing set are being shared (recall, 8 is simply an example, it could be 2, 4, 8, 16 or 32 or any other number which is a subset of all the cores), then pointers can be allocated to other processors or other coherence regions that request the data. Thus on an invalidate, a broadcast invalidate is issued to the initial sharing set of 8, and individual invalidates to the others. The assumption here is that broadcast invalidates among the 8 sharing set of cores is easy, perhaps because they are all close together.

Another variant for either the PCC or SCC schemes is called Optimistic On-Demand Coherence (OODC). This scheme optimized for the case where read-only sharing of data is extremely common and we want to optimize for this in an optimistic manner. The approach works by allowing one or more caches to cache data (whether shared or private) in their caches for reading. (Cache requests to the home tile or home shim indicate whether it is a read request or a write request). In this scheme, when the home tile or home shim sees a read request, it simply returns the data value and does not keep track of any information. The requester caches the data in its caches and reads it. If a cache wants to write it then it must go through a protocol. The cache sends a request to write to the home tile/shim. The request to write can also come from a cache that does not yet have a read copy, rather its first request is to write the data. (The cache needs to do so only for shared data items that it wants to modify. Shared data items can be marked as such in the TLB, in the cache state or can depend on the address used to access them). Then the home tile notices that it does not have a directory entry associated with this address. It then sends a broadcast invalidate to all the tiles in the system. All tiles (or cores) will perform a local check and possible invalidate of the read copies of the data and then send acknowledgements back to the home location. The home location can then allocate a directory entry for this cache line and send a copy that is writable to the tile that requested it. The benefit of this scheme is that for the majority of data that is only read and not written, there is no need to waste directory state.

A broadcast invalidate can be implemented efficiently for the entire multicore chip or for a region of the chip using a tree broadcast algorithm. This can be done using a broadcast invalidate implemented using the static network with a previously coded up sequence on the multicore chip. Acknowledgements can also be collected in a tree fashion. A static network based code sequence can also be used to accumulate all the acknowledgements from the system. This form of broadcast invalidate and collection of acknowledgements is similar to barrier synchronizations implemented using the dynamic or static networks in a multicore chip such as the TILE processor of Tilera.

In some multicore schemes, the directory can be limited only to those cache lines which are actually cache on the chip, therefore the total amount of directory state grows only in proportion to the total cache size in the system (and not that of main memory).

When the directory protocol is being implemented by software (or even if implemented in hardware), the directory state on other cores can be accessed in neighborhood caching or SNC mode. This way, an overloaded tile can use a neighbor's directory state memory to store its own directory state.

In either of the schemes PCC or SCC, other variants and optimizations of directory protocols discussed in the literature can be used in conjunction with the schemes described above.

4. Private/Shared Cache Hierarchy

The following features can be included in an approach for providing cache coherence.

The physical address space is distributed among the tiles/L2 caches such that every physical address has a unique home tile. (Alternatively, this can be done on virtual addresses, without loss of generality. Generally, any scheme that distributes or interleaves cache lines among the cores at a cache line granularity or at a user choosable granularity can be used). This can be done by applying some function to the physical address (or virtual address) or through the TLB. For clarity, the rest of this discussion assumes that the home tile ID is PA<11:6>. In other words, bits 11 through 6 of the physical address. (Other bits can also be used).

This example retains a two level cache hierarchy in the core, rather than add a third level of cache. (Alternatively, if there are more than 2 levels of cache in the core, then this scheme can be applied to the highest level of cache hierarchy in a core). The second level cache size can be, for example, 128K. The tile count can be, for example, 64.

The second level cache (or optionally the first level cache) is augmented with an optional coalescing write buffer (CWB). The coalescing write buffer has a 64 B (64 byte) data field, a physical address CAM, and a 64 B dirty mask. (The specific data sizes are used for clarity only. The sizes can be modified.) For example, the CWB can store the addresses written into, and the values written into them. When coalescing subsequent writes to the same addresses, the tile overwrite the previous values in the CWB.

Keeping the stored values in the CWB without having them go to the memory system (e.g., the cache and/or the main memory) is useful because a write issued into the memory system causes the coherence protocol to potentially invalidate all the other copies. By storing the values locally in a CWB, the memory invalidate messages can be postponed to a later time.

The first level (L1) cache within the processor 204 of a tile is a private cache. It maps the entire global PA (physical address) space.

The cache 206 coupled to the processor 204 in the tile can be used as a combined shared/private cache. It can be configured to cache data in two ways: (a) as part of a shared distributed cache (equivalent to a shared global/distributed L3 cache), and (b) as a private cache for data requested by this tile but homed in a different tile (equivalent to a private local L2 cache). For the shared distributed cache, each memory line has an assigned home location in the cache 206 of one of the tiles. For the private local cache, private copies of the memory lines homed in a different tile can be stored in the cache 206. The private local cache is "private" in the sense that it is for the private use of the locale tile, however it may store cache lines that contain copies of "shared data" that is shared among the tiles. When a processor in a tile accesses a memory line, if the memory line is not in the private L1 cache, and not in the private (L2) cache portion of the cache 206, the processor determines the home tile location (e.g., using a hash function) to access the data from the shared distributed cache (which may in some cases be on the same tile).

Thus, there are two separate addressing functions into the cache 206. When probing the cache 206 for a local (L2) request, the full PA is used. This indexing function is called the private local indexing function (or PLIF). When probing the cache 206 for a global (L2) request, bits PA<11:6> are not used. The latter function used for shared addresses (that are homed on a particular tile) is called the shared home indexing function (or SHIF). In other words, the cache maps the entire PA space for the private cache, but maps only ¹⁄₆₄th (or 1/P of the address space, if there are P tiles) of the PA space as part of the shared distributed cache. The benefit of indexing the cache after deleting the PA<11:6> addresses (or in general, the bits that are used to determine which tile that address is homed in) is that every cache set in a given cache can be used for homing shared addresses. If the bits are not deleted, then certain sets of the cache will never be used for shared references. In other words, only addresses with a given PA<11:6> will arrive at this cache, and these will map, generally, to only ¹⁄₆₄th of all the cache sets (or in general, 1/Pth of all cache sets if there are P tiles).

In some cases, a tile may determine whether to access a given memory location in the local cache or in a home location in another tile, depending on what operation included in an instruction performed by the processor of the tile. For example, for certain synchronization operations issued by a processor, a tile does not access the local cache even if that value is stored in the local cache. Instead, a "requesting tile" sends the operation specification (e.g., test-and-set, increment-word, or some other atomic operation) and the address of the word to operate upon directly to the home location in another tile. The directory controller at the home location performs the operation there. The directory controller at the home location can also send the original value (for a test-and-set operation) of the location to the requesting tile. The modification of the location is not reflected at the requesting location. Thus, the directory controller treats the operation differently that a normal read or write operation. An advantage of this is that synchronization variables are often widely read and written, so caching them locally and modifying them locally could incur excessive invalidation traffic.

Write requests (or "stores") are buffered in the coalescing write buffer, and are sent to the home tile in a lazy fashion (e.g., when the CWB is full, or when an instruction is received to purge the CWB). The CWB can be purged on a memory fence (MF) retirement instruction. In other words, the CWB values are sent out to update memory upon events such as a memory fence instruction, or some other synchronization instruction such as a test-and-set. When the CWB is purged the memory lines stored in the buffer are updated to the home tile location. Any copies of the memory line in the private local caches can be invalidated or updated.

Although they are described jointly in the previous example, the concepts of a CWB and two-pronged shared/private cache accesses can be used separately. For example, instead of using a CWB, a write-through scheme can be used in which write requests go directly to the home location to update a value. Each write request can be associated with an expected acknowledgment message. On a memory fence instruction the processors can stall until all outstanding write requests have been acknowledged.

In some implementations, the cache 206 uses a write-through policy for writing copies of cache lines stored as private L2 cache lines that are assigned a home location in a different cache memory, and uses a no-write-allocate write miss policy for these cache lines. The cache 206 uses a write-back policy for writing copies of cache lines stored as shared L3 cache lines, and uses a write-allocate write miss policy for these.

Sharing information is kept at the shared distributed cache, with a single sharing field per cache block. The sharing information can be stored by using 1 bit in the sharing field to reflect more than one core processor. For example, the sharing field can use 1 bit per four processors, indicating if one or more processors in the group share the block.

The shared distributed cache is inclusive: if block X is in a private cache, then a copy of it is in the home tile's cache. On a displacement of a block from the shared distributed cache, the same block in the private caches are invalidated.

A network can be used to carry messages associated with the coherence protocol such as invalidate messages that is independent from (e.g., that uses an independent physical communication medium such as a separate set of wires) a network used to handle cache misses and return data. Invalidate acknowledgements can flow over a third network. Alternatively, logical channels can be used to provide separate networks that are logically independent but share a common physical communication medium, and thus emulate multiple physical networks. For example, each separate logical network can have independent dedicated buffer resources to avoid deadlock.

On a write from a tile, the data is merged at the home location, and the sharers (if any) are invalidated. The home location does not expose the newly written data until the invalidate acknowledgment messages are received from all sharers.

The coherence point for block X is the home location for block X.

4.1 Simple Read Flow

On a read, a tile first checks its private level 1 and level 2 caches. The index function used is the PLIF. If hit, data is returned. If miss, based on PA<11:6>, the tile sends a read request over the TDN to the home tile. The home tile is indicated by PA<11:6>. In some cases, the home tile might be the same tile, in which case the cache is reaccessed with the shared home index function SHIF. The home tile checks its cache for the requested block, and assuming hit, returns the data to the requesting tile. The home tile adds the requesting tile to the sharing list for the block.

4.2 Simple Write Flow

When a write is pushed out of a tile's coalescing write buffer, the masked write (i.e., which specific byte or word is to be updated) is sent to the home tile's cache. The home tile merges the write with the background data (i.e., the data previously contained in that cache line), invalidates any sharers, and collects invalidate acknowledgements.

4.3 Modifications

The above scheme can be modified in several ways.

4.3.1 Local Home Modification

In the above scheme with two indexing functions, a given memory line might be present in two different cache lines in the same cache in a given tile. While this is not a correctness issue, it may not be the best use of cache resources. Therefore, there is a modification in which if a tile requests a cache line and that cache line is also homed on that same tile (i.e., on the requesting tile), then the PA used to index the cache during the private indexing PLIF operation is modified on the fly to use the shared home indexing function SHIF on the first access.

This modification of the indexing function can be accomplished in several ways. For example, it can be done by comparing the index bits for homing (PA<11:6>) against the index bits corresponding to this tile before accessing the cache. If the bits are the same, then the tile uses the SHIF rather than the PLIF.

In a further modification, the tile can start indexing the cache with the usual set of bits (i.e., the PLIF) and in parallel compare PA<11:6> with a register containing the index bits corresponding to this tile. If there is a match, then the tile aborts the cache read that has begun with the PLIF, and reissues the address according to the shared home indexing function SHIF to the cache. The cache access takes a 1 cycle hit in this case. The tile can also overlap the compare with the previous cache access. In other words, as the address is coming into the cache, its home bits can be compared somewhere along the way and a bit can be set along with the address that says that this address can use the SHIF.

The above modifications also have the advantage that they reduce the number of caches accesses from two to one.

In another option, the indexing functions for local cache access and shared cache access can be the same. In other words, the PLIF and SHIF indexing functions can be the same.

In some implementations, if a processor accesses its associated cache using address A, and if that cache happens to also be the home location for the address A, then the access of that cache is treated like accessing a shared cache.

4.3.2 Directory Victim Cache

One possible performance issue with the previous scheme is the fact that evictions on home tiles induce evictions in tiles sharing the data. Because the directory information is not stored in memory, when a shared line is evicted from its home tile, all copies cached at tiles sharing the line are invalidated. If this is not done, it is possible that a tile might end up with stale data. This subsection describes one possible approach to address this issue. The next subsection describes another approach.

When a shared cache line is evicted from the home tile's cache, the directory information for the evicted line is placed in the Directory Victim Cache (DVC). The DVC contains directory information (not data), and is indexed via PA (physical address). When an incoming snoop arrives at a home tile and misses in the cache, a request is sent to memory to fetch the data. Additionally, the DVC is accessed and if the PA hits in the DVC, the directory information is restored to the cache and removed from the DVC. When an address, a, must be evicted from the DVC, the tiles sharing address a are sent invalidate messages over the invalidate network. Basically, the DVC allows directory information for a shared line to be cached even when the data is not present in the home tile, delaying the global invalidation of shared data until eviction from the DVC. The DVC can be small and highly associative (for example, a content addressable memory).

4.3.3 Directory Aware Cache Replacement Policy

Another solution to the problem of evictions is to implement a cache replacement policy that is "Directory Aware." The high level idea is to prefer replacing lines that are not very shared over lines that are heavily shared. For example, consider the case where there is a 2-way associative cache. An incoming snoop misses in the cache, sends a request to memory and must choose a line for eviction. Both ways have valid data, however, the directory information in way 1 says no tiles are sharing the data, while the directory information in way 0 says several tiles are sharing the data. The replacement policy should choose way 1 as the way for eviction in this case, resulting in fewer cache line invalidations.

The same technique can be easily generalized to any set-associativity. In general, the design is as follows. The cache line replacement logic attempts to replace a cache line (from a set with many cache lines) which does not have any sharing state associated with it. In other words, when a cache line is evicted, the tile tries to evict a line that does not show any directory sharing pointers.

If all cache lines have sharing state, then the tile evicts the line with the smallest number of sharers. Further if there are cache lines with a written state of shared data versus only read data, then the tile preferably evicts a line with written data (or alternatively, evicts a line with read and shared data).

In general, the scheme combines knowledge about the directory state in the cache, and the LRU or replacement state normally associated with caches, in order to make an eviction choice.

4.3.4 Sharing Cache State

The coherence scheme can be modified further by using the cache state that is used to store directory state for multiple purposes. For example, during an eviction or other situation in which invalidates are happening, the tile keeps track of the number of acknowledgements that have been returned from other tiles. This can be stored as a counter in the same set of bits that are used to store directory information. Each time an acknowledgement comes back, the counter is incremented (or decremented).

The tile can also keep a small buffer that contains a list of outstanding transactions along with an acknowledgement counter associated with each. This information can also be stored in one of the memory storage locations normally used for cache and memory access, such as a memory retry FIFO.

4.4 Spatial Hierarchy

Constructing hierarchical shared caches in a tiled processor can be based on spatial arrangement of the tiles. For example, in a 64 tile chip, each quadrant could serve as a shared L3 cache for the tiles in each quadrant, and all 64 tiles could serve as a shared L4 cache. This saves directory overhead (16 bits for 64 tiles). In other words, when there is a need to find a home location for a cache line, a home location is found from only 16 tiles out of 64 by using one hash function. Then, if the cache line is not present in those 16 tiles, the hash function is applied again and the resulting cache is examined to see if the home location is there.

5. I/O Coherence

Figure 9A:
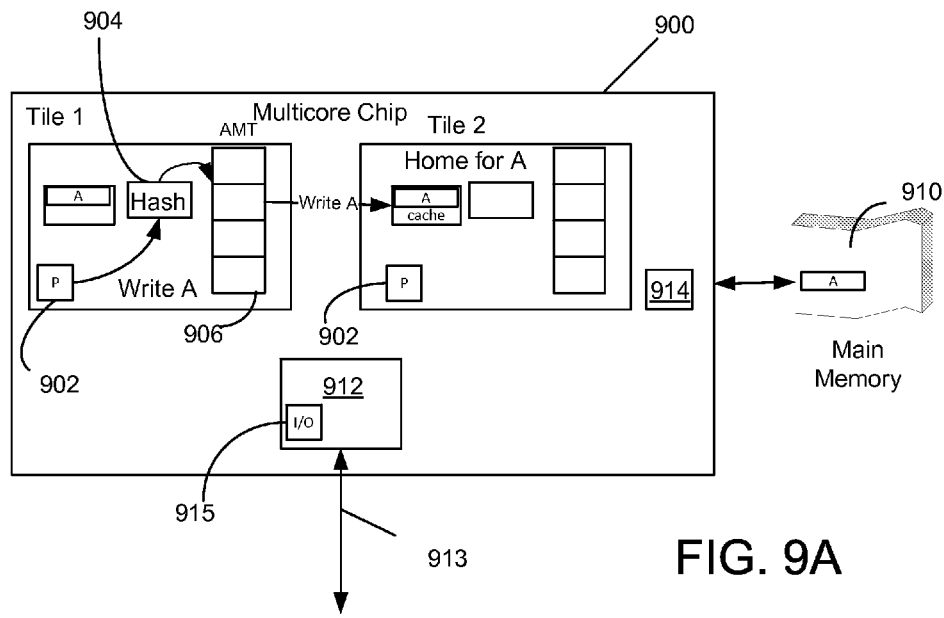
FIGS. 9A-9C are diagrams of a multicore chip with an I/O module.

Some modules on a multicore processor other than the processor cores may have access to memory. An example of such a module is an I/O module. Maintaining memory coherence in the presence of such modules can be part of an overall coherence protocol. As an extension to the proxy cache coherence approach, a technique for ensuring I/O coherence is called "ProxyIO coherence." As a review of proxy cache coherence, FIG. 9A shows a multicore processor 900 in which a processor 902 in Tile 1 is writing a shared cache location having address A (e.g., a cache line, or a data word within a cache line, or a region extending over multiple cache lines) using circuitry 904 implementing a hash function and address mapping table (AMT) 906 to deliver a write transaction to the home location in the cache 906 of Tile 2 using an on-chip interconnect (e.g., a dynamic network). The home tile Tile 2 accepts the write transaction from Tile 1. The home tile performs the normal coherence processing, and sends a write acknowledgement message back to Tile 1 when the write transaction is complete. Normal coherence processing at Tile 2 (home tile) can include the following actions as needed: (1) updating the location A in Tile 2's cache 906; (2) if A was not in Tile 2's cache, then fetching the cache line (or at least the background data from the cache line) from main memory 910, storing the background data from that line in its cache 906, and optionally recording Tile 1 as a sharer in the directory entry on Tile 2 associated with location A if the cache 906 of Tile 1 is updated with the written location A (including any background data of the cache line). A similar set of actions happen at Tile 2 if Tile 1 makes a read request of data at location A. Tile 1 is recorded as a sharer in Tile 2's directory for a read request from Tile 1 since Tile 1 stores the latest value of location A in its cache on a read request, and optionally recorded as a sharer (depending on the specific protocol being used—e.g., write-allocate or no-write-allocate) for write requests from Tile 1, since Tile 1 does not necessarily need to store the latest value of location A in its cache.

5.1 I/O Coherence Examples

Figure 9B:
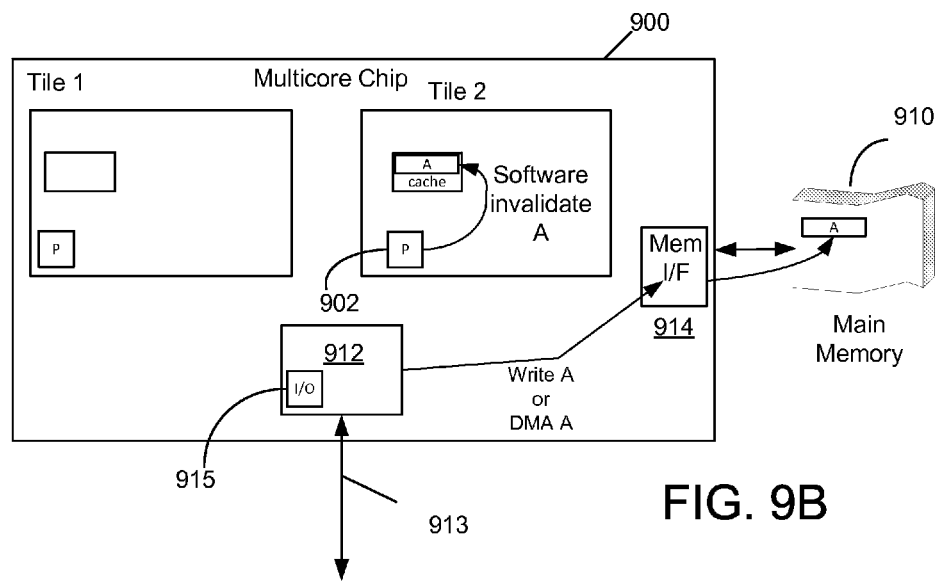

An I/O module 912 includes an I/O interface 913 such as a network port (e.g., a XAUI interface or a PCI-e interface) and circuitry 915 to enable the module 912 to process direct memory access (DMA) transactions initiated from a tile, for example, or to otherwise handle a transaction to write data into off-chip main memory via a memory interface 914 (for example, into main memory location A). In this situation, if some tile has the same data location (A) cached in its cache, a coherence protocol ensures that these caches are managed appropriately (e.g., invalidated or updated). This situation is shown in FIG. 9B. This situation is case 1: the "memory coherence case."

An I/O module is also able to process a DMA transaction or otherwise store data directly into the cache of a given tile, for example, into some other memory location B. In this case, a coherence protocol handles the situation that the main memory location B will have different data from the cache location B written by the I/O module. Further, if one or more other tiles have the same data location (B) cached in their cache, there is another potential coherence situation to be dealt with. The situation that occurs when the I/O module 912 writes directly into a tile is case 2: the "cache coherence case."

Various approaches can be used to maintain coherence for case 1 and/or case 2. One approach to maintaining coherence for case 1 relies on software. To do so, as illustrated in FIG. 9B, the I/O module 912 writes the memory location (for example, A) to main memory 910 via the memory interface 914. Now, suppose Tile 2 needs to consume the data that has just been written to main memory 910 by the I/O module 912. Further, assume that Tile 2 potentially has the location A in its cache as shown. To ensure that Tile 2 does not read stale data, the location A is invalidated in association with the write transaction from the I/O module 912.

For example, in some coherence protocols Tile 2 pre-invalidates the copy of the memory location in its cache 903 that is being written by the I/O module 912 (in this example location A) prior to reading the location. Tile 2 can be asked to do so by the operating system through an instruction issued by the processor 902 to invalidate location A, or by the I/O module 912 directly, for example, using a message sent over the interconnection network. The message can be sent just to Tile 2, where Tile 2 is the home location for A. Tile 2 can then invalidate the location in its cache that may be storing a copy of the location. A (e.g., as determined by a directory entry associated with location A). If software is invalidating the locations, further invalidations do not necessarily need to be sent to other possible sharers. An exemplary order of operations would be: 1. Invalidate memory region (e.g., cache line) containing A from Tile 2's cache. 2. Initiate DMA transfer of data into main memory. This ensures that the consuming tile doesn't pick up stale data. Since the location gets invalidated in the cache, a subsequent read of the location will obtain the up to date version from main memory. This part of the protocol addresses case 1.

The protocol can be extended to address case 2 by invalidating all possible sharers as follows: Tile 2 (the home tile) gets the message to pre-invalidate the cache line(s) related to location A. Tile 2 would then flush the locations from its cache, which would send a message to the other tiles that are indicated as caching the data to cause them to invalidate the location (e.g., assuming the PCC scheme is running).

Figure 9C:
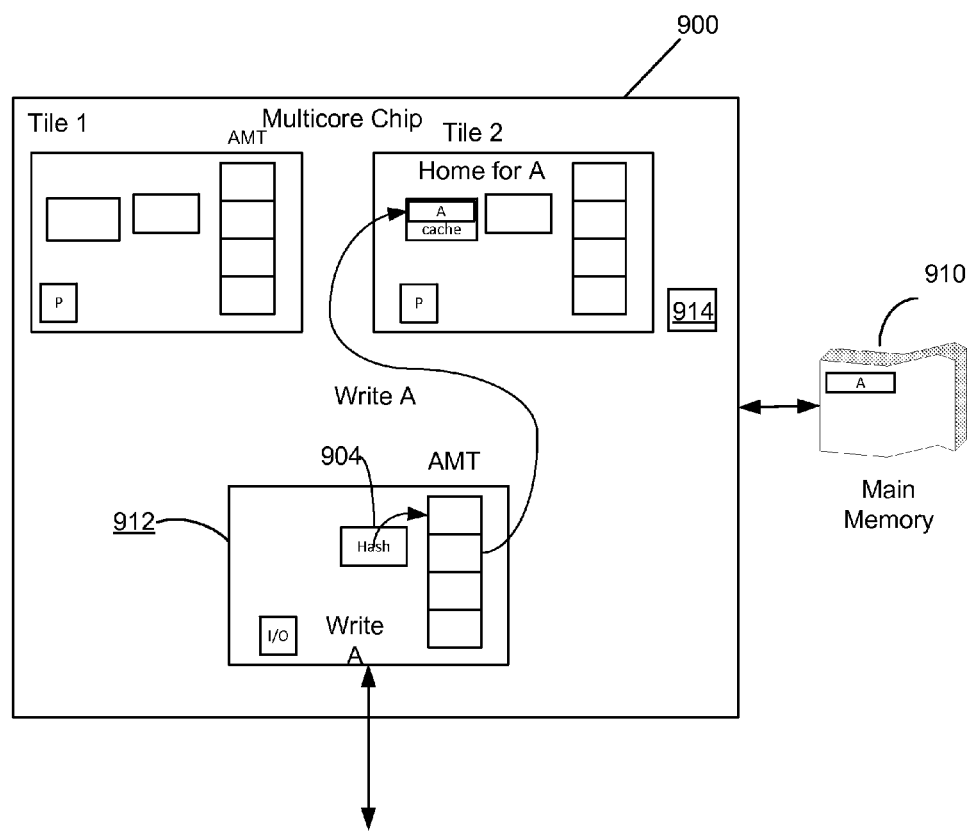

FIG. 9C illustrates an example in which a ProxyIO coherence protocol is used for situations in which an I/O module 912 writes or reads data to or from a tile's cache.

As part of the provide I/O coherence protocol, the I/O module 912 includes a second mode of operation, as follows. In this mode, the I/O module 912 is configured to deliver write transactions directly to home tiles in a coherent fashion, over the on-chip interconnect (e.g., a dynamic network). This mode of operation is in addition to the first mode described above in which the I/O module 912 writes main memory and software maintains coherence with explicit invalidation of the location in a tile's cache.

In the second mode, the I/O module 912 includes circuitry 904 implementing a hash function and address mapping table 906 to deliver write transactions to the home tile (Tile 2 in this example). Instead of a hash function and address mapping table, the I/O module 912 can use other techniques that use, for example, one or more bits in the address to find the home location. The home tile accepts the write transactions from the I/O module 912 just as it would write transactions from a tile. The home tile performs the normal coherence processing, with some differences as noted below, and sends a write acknowledgement message back to the I/O module 912 when the write transaction is complete.

Coherence processing at the home tile for memory access requests from the I/O module 912 ("I/O coherence") includes a set of actions that are similar to those for PCC. However, there are some alternative coherence processing that can occur at the home tile for handling requests from the I/O module 912, as described below:

(1) In normal processing for requests from other tiles, coherence transactions write the modified byte or word in the home tile's cache. If that cache line was not present in the home tile, then the background data in that cache line are fetched from main memory and written into the cache line as well. With I/O coherence, the whole cache line is typically written in one action, because I/O writes generally involve blocks of data that are typically bigger than a single byte or word. Thus, in the case of a request from an I/O module 912, the home tile does not need to fetch background data from main memory.

(2) For processing read transactions, the I/O module 912 sends read requests to the home tile, again, over the interconnection network (e.g., over a first dynamic network). The home tile will check its cache, and if the requested cache line exists, it will deliver the requested cache line back to the I/O module 912 over the interconnection network (e.g., over a second dynamic network different from the first dynamic network). If the requested line is not present in the home tile's cache, the home tile will get the cache line from main memory and deliver it to the I/O module 912, with or without allocating the line into the cache, depending on the protocol being used. In some cases, the tile does not allocate the line in the cache to avoid polluting that tile's cache since, if the line was not present in the cache, it is likely that the line is not needed by the tile. If the cache line exists in the home tile's cache, then the home tile delivers it to the I/O module 912, and cache line continues to be stored in the home tile's cache.

(3) Whether it is a read or write transaction initiated by an I/O module 912, the I/O module 912 is not recorded as a sharer of the cache the line in the home tile's coherence directory. The directory does not need to keep a record of the I/O module 912 in the directory entry since the I/O module 912 does not cache the data, rather it just passes the data in or out over an I/O interface. Thus, there is no need for a directory entry since there is no need to invalidate the data at the I/O module 912 at a later point.

Various alternative can be implemented in the coherence protocol. For example, the I/O module 912 does not need to maintain the AMT and hash function if a DMA command from a tile to the I/O module 912 includes an indication of which tile to send the writes/reads to. Though, in some cases, it is useful to use the AMT and hash function to enable a fine-grain data smearing feature.

Also, in some cases if a write transaction is occurring in a region in which the previously stored data is no longer needed, the home tile does not have to fetch background data for incomplete line writes that occur, for example at the beginning or end of a multi-line write. The I/O module 912 can simply specify the start byte of the write request and/or the end byte of the write request. In some cases, the bytes in the line that are not written can be filled with zeros, for example, to avoid a potential security hole in which the old data belongs to a different process and other processes should not be able to see the old data. A benefit of not needing to fetch the background data is reduced bandwidth demand on the memory interface. In cases in which the previously stored data is needed, the tile can fetch the background data from main memory in the case of a partial line write.

It is to be understood that the foregoing description is intended to illustrate and not to limit the scope of the invention, which is defined by the scope of the appended claims. Other embodiments are within the scope of the following claims.

What is claimed is:

1. A multicore processor, comprising:
a plurality of cache memories;
a plurality of processor cores, each processor core associated with one of the cache memories; and
shims that translate network messages into a format that memory controllers can process to access a main memory; and
directory controllers coupled to associated shims, with memory references made to a portion of main memory passing through that memory portion's associated shim to memory, with the associated shim and directory controller being the home location for cache entries supplied by the main memory attached to the shim.

2. The processor of claim 1 wherein the cache is organized with a hierarchy with a second level being one level higher than a first level in the cache hierarchy.

3. The processor of claim 1 wherein the processor cores are a tiled processor.

4. The processor of claim 3 wherein the processor cores are configured to handle cache misses from a given tile by sending the misses to a shim of a home memory controller.

5. The processor of claim 4 wherein the shim of the home memory controller serves as a proxy for the directory for a corresponding portion of memory.

6. The processor of claim 3 wherein storage space for a directory state is only allocated for cache lines contained in at least one cache in a tile on the tiled processor.

7. The processor of claim 1 wherein the shim of the home memory controller contains a portion of the directory that is related to the region of memory that the memory controller shim controls.

8. The processor of claim 7 wherein the shim of the home memory controller does not have to contain the memory being accessed.

9. The processor of claim 1 wherein directory state is filtered to have storage space only for cache lines corresponding to shared data contained in at least one cache in a tile on the tiled processor.

10. The processor of claim 1 wherein the multicore processor has the directory controller associated with the associated shim and a DRAM controller present on-chip, while DRAM and directory store are present off-chip.

11. The processor of claim 1 wherein neighborhood and singly cached caching techniques are used to find the home tile for a given cache line.

12. The processor of claim 1 wherein directory entries are associated with cache lines.

13. The processor of claim 12 wherein directory entries are operated upon in a corresponding manner when the corresponding cache line in the corresponding home tile is operated upon.

14. The processor of claim 13 wherein the directory state is compressed using a method caching or coarse grain directories to store directory state for a region of memory which is bigger than a cache line.

15. The processor of claim 1 wherein each cache memory of at least some of the cache memories is configured to maintain at least a portion of the respective cache memory in which each cache line is dynamically managed as either local to the associated processor core according to a first level in a cache hierarchy or shared among multiple processor cores according to a second level in the cache hierarchy.

16. A multicore processor, comprising:
a plurality of cache memories;
a plurality of processor cores, each processor core associated with one of the cache memories, each processor core includes one of the cache memories coupled to an internal processor, and other cache memories located outside of the processor;
multiple memory controllers;
shims providing memory access paths from the cache memories through respective ones of the multiple memory controllers to a main memory, with the shims configured to translate network messages to access the main memory; and
a directory controller coupled to the shims, with memory references to a portion of main memory pass through that memory portion's shim to memory.

17. The processor of claim 16 wherein the directory controllers and storage of the directory state are placed next to caches in each core on-chip in a multicore chip.

18. The processor of claim 16 wherein, the directory controller is in a location that is on-chip and is separate from off-chip main memory and directory state is stored on a physical storage that is on-chip and the processor cores are a tiled processor.

19. The processor of claim 16 wherein the directory controllers and storage for directory state are placed at the on-chip memory controllers in the path of main memory accesses from many cores.

20. The processor of claim 16 wherein a shim on a home tile of a home memory controller does not have to contain the memory being accessed.

21. The processor of claim 16 wherein storage space for a directory state is only allocated for cache lines contained in at least one cache in a tile on the tiled processor.

22. The processor of claim 16 wherein a common directory entry is used for all cache lines in a given page or some larger region of memory than a cache line to compress the directory state.

23. The processor of claim 16 wherein the caches are configured to maintain a portion of the cache memory that is local to the associated processor core and to maintain a portion of the cache memory that is shared among multiple processor cores.

24. The processor of claim 16 wherein the portions that are local or shared are assigned on-demand on a cache line bases.

25. The processor of claim 16 wherein the directory state associated with the cache line can indicate whether the cache line is local or share.

26. A method for managing cache memories associated with respective processor cores in a multicore processor, the method comprising:
providing memory access paths from the cache memories to a main memory through memory controller shims to translate network messages to access the main memory; and
forming memory references to a portion of the main memory to pass through that memory portion's shim and an associated directory controller, with the associated directory controller and storage for a directory state located on-chip and separate from main memory.

* * * * *